United States Patent
Shiba et al.

(10) Patent No.: US 7,277,540 B1
(45) Date of Patent: Oct. 2, 2007

(54) ARITHMETIC METHOD AND APPARATUS AND CRYPTO PROCESSING APPARATUS FOR PERFORMING MULTIPLE TYPES OF CRYPTOGRAPHY

(75) Inventors: Masue Shiba, Fuchu (JP); Shinichi Kawamura, Kodaira (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 0 days.

(21) Appl. No.: 09/487,483

(22) Filed: Jan. 19, 2000

(30) Foreign Application Priority Data

Jan. 20, 1999 (JP) ................................. 11-011989
Jul. 23, 1999 (JP) ................................. 11-209831

(51) Int. Cl.
| | |
|---|---|
| H04K 1/00 | (2006.01) |
| H04L 9/00 | (2006.01) |
| H04L 9/28 | (2006.01) |
| G06F 7/00 | (2006.01) |
| G06F 15/00 | (2006.01) |
| G06J 1/00 | (2006.01) |
| G06F 7/44 | (2006.01) |

(52) U.S. Cl. ........................... 380/28; 708/7; 708/135; 708/492; 708/503

(58) Field of Classification Search ................ 708/491, 708/492, 654, 655, 513, 603, 620, 523, 7, 708/135, 501, 503; 713/174; 380/265, 37, 380/30, 28; 714/808; 709/492
See application file for complete search history.

(56) References Cited

U.S. PATENT DOCUMENTS

| | | | | |
|---|---|---|---|---|
| 3,064,896 A | * | 11/1962 | Carroll et al. ............... | 708/655 |
| 4,037,093 A | * | 7/1977 | Gregg et al. ................ | 708/492 |
| 4,281,391 A | * | 7/1981 | Huang ........................ | 708/491 |
| 4,692,888 A | * | 9/1987 | New .......................... | 708/603 |
| 4,949,293 A | * | 8/1990 | Kawamura et al. ......... | 708/491 |

(Continued)

FOREIGN PATENT DOCUMENTS

DE 196 44 688 A1 4/1998

(Continued)

OTHER PUBLICATIONS

Horowitz, E. "Modular arithmetic and finite field theory: A tutorial", 1971, Proceedings of the second ACM symposium on Symbolic and algebraic manipulation.*

(Continued)

*Primary Examiner*—Kambiz Zand
*Assistant Examiner*—Michael J. Simitoski
(74) *Attorney, Agent, or Firm*—Finnegan, Henderson, Farabow, Garrett & Dunner, L.L.P.

(57) ABSTRACT

An arithmetic apparatus for performing a long product-sum operation includes an integer unit arithmetic circuit, a finite field $GF(2^m)$ based unit arithmetic circuit logically adjacent to the integer unit arithmetic circuit, a selector for selecting the integer unit arithmetic circuit or the finite field $GF(2^m)$ based unit arithmetic circuit, and an adder circuit which has a buffer for storing interim result data, adds the interim result data to the result data obtained by one of the integer unit arithmetic circuit and the finite field $GF(2^m)$ based unit arithmetic circuit which is selected by the selector, propagates a carry in an integer unit arithmetic operation, and propagates no carry in a finite field $GF(2^m)$ based unit arithmetic operation.

4 Claims, 15 Drawing Sheets

U.S. PATENT DOCUMENTS

| | | | | |
|---|---|---|---|---|
| 4,989,171 | A | * | 1/1991 | Hollmann .................... 708/492 |
| 5,103,419 | A | * | 4/1992 | Toyokura et al. ........... 708/603 |
| 5,321,752 | A | * | 6/1994 | Iwamura et al. ............ 713/174 |
| 5,379,243 | A | * | 1/1995 | Greenberger et al. ....... 708/492 |
| 5,467,297 | A | * | 11/1995 | Zook .......................... 708/492 |
| 5,513,133 | A | * | 4/1996 | Cressel et al. ............... 708/620 |
| 5,574,677 | A | * | 11/1996 | Cohen ......................... 708/655 |
| 5,689,452 | A | * | 11/1997 | Cameron .................... 708/492 |
| 5,724,279 | A | * | 3/1998 | Benaloh et al. ............. 708/491 |
| 5,742,534 | A | * | 4/1998 | Monier ........................ 708/492 |
| 5,943,348 | A | * | 8/1999 | Ly .............................. 714/761 |
| 5,964,826 | A | * | 10/1999 | Wei ............................ 708/492 |
| 6,009,450 | A | * | 12/1999 | Dworkin et al. ............ 708/492 |
| 6,044,389 | A | * | 3/2000 | Weng et al. ................. 708/492 |
| 6,049,815 | A | * | 4/2000 | Lambert et al. ............ 708/492 |
| 6,141,420 | A | * | 10/2000 | Vanstone et al. ............ 380/30 |
| 6,178,436 | B1 | * | 1/2001 | Blake et al. ................. 708/492 |
| 6,230,179 | B1 | * | 5/2001 | Dworkin et al. ............ 708/492 |
| 6,349,318 | B1 | * | 2/2002 | Vanstone et al. ........... 708/492 |
| 6,397,241 | B1 | * | 5/2002 | Glaser et al. ............... 708/625 |
| 6,920,473 | B2 | * | 7/2005 | Elbe et al. ................... 708/492 |
| 2002/0138534 | A1 | * | 9/2002 | Drescher .................... 708/492 |
| 2004/0199560 | A1 | * | 10/2004 | Dupaquis et al. ........... 708/492 |

FOREIGN PATENT DOCUMENTS

| | | | |
|---|---|---|---|
| FR | 2679054 A1 | * | 1/1993 |
| JP | 10-153956 | | 6/1998 |
| JP | 11-143688 | | 5/1999 |

OTHER PUBLICATIONS

Becker, Dirk. "4-bit multiplier", Aug. 1998.*

Drescher, Wolfram et al. "VLSI Architecture for Datapath Integration of Arithmetic Over GF($2^A$m) on Digital Signal Processors", 1997 IEEE.*

Paar, Christof et al. "Efficient Multiplier Architectures for Galois Fields GF($2^A4n$)", 1998 IEEE.*

Okada, Soichi. Translation of Japanese Patent Application Heisei 11-143688, 5-58-1999.*

W. Drescher et al., VLSI Architectures for Multiplication in GF($2^m$) for Application Tailored Digital Signal Processors, VLSI Signal Processing, IX, 1996., Workshop on San Francisco, CA, USA Oct. 30-Nov. 1, 1996. ISBN: 0-7803-3134-6.

Search Report issued by French Patent Office on Dec. 16, 2004 in French Application No. 0000680.

Notification of Reasons for Rejection mailed on Mar. 2, 2006, from Japanese Patent Office In Japanese Patent Application No. 11-011989.

Final Notice of Rejection mailed on Mar. 14, 2006, from Japanese Patent Office in Japanese Patent Application No. 1999-209831.

Decision of Rejection mailed on May 30, 2006, from Japanese Patent Office in Japanese Patent Application No. 11-011989.

Decision of Rejection mailed on Jun. 6, 2006, from Japanese Patent Office in Japanese Patent Application No. 11-209831.

Naoya Torri et al. "Trial of Elliptic Curve Cipher Chip,"IEICE Engineering Sciences Society Convention, Sep. 7, 1998, p. 115.

D.E. Knuth, "The Art of Computer Programming," (Reading, Mass., Addison-Wesley, 1997), vol. 2, 3$^{rd}$ Edition, pp. xii-xiii, 272-275 and 345-348.

* cited by examiner

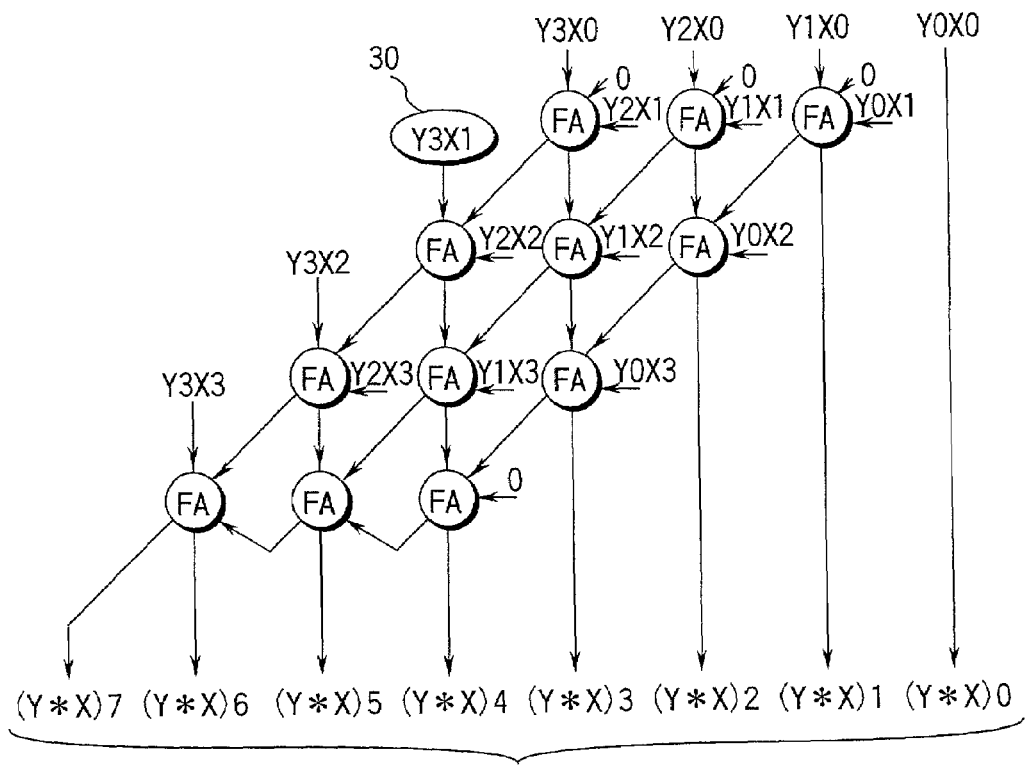
FIG. 3A
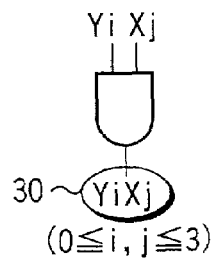
FIG. 3B
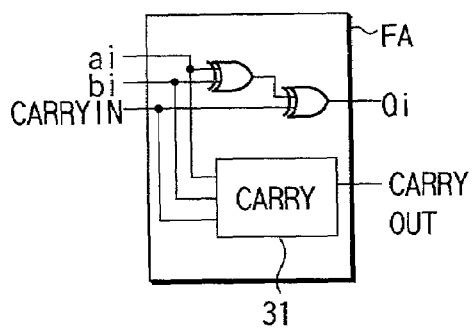 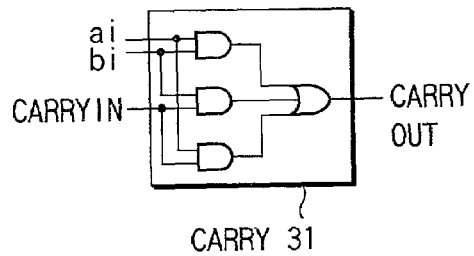
FIG. 3C  FIG. 3D

FIG. 17

REQUIRED NUMBER OF CLOCKS FOR COMMAND

| COMMAND | | m=160 | m=1024 |
|---|---|---|---|
| ADDITION | | 14 | 68 |
| MULTIPLY | | 64 | 2,116 |
| SQUARE | | 25 | 133 |
| DIVIDE | PRE-CALCULATION | 35 | 35 |
| | MAIN BODY | 134 | 2,564 |

REQUIRED NUMBER OF CLOCKS FOR GF($2^{160}$)

| ARITHMETIC OPERATION | NUMBER OF CLOCKS | SR RATIO |
|---|---|---|
| ADDITION | 14 | ABOUT 4.6 TIMES |
| MULTIPLY | 198 | ABOUT 1.2 TIMES |
| SQUARE | 159 | ABOUT 1 TIMES |

(SR RATIO)=(NUMBER OF CLOCKS)/
  (NUMBER OF CLOCKS IN SHIFT REGISTER CIRCUIT)

CIRCUIT SIZE (NUMBER OF GATES) OF COPROCESSOR

| ARITHMETIC UNIT | 8k |
|---|---|
| CONTROLLER | 12.8k |
| RAM | 8.5k |
| I/F | 0.5k |
| WHOLE | ABOUT 30k |

FIG. 20

ADDITIONAL CIRCUIT SIZE (NUMBER OF GATES) FOR INTEGER BASED COPROCESSOR

| ARITHMETIC UNIT | 1k |
|---|---|
| CONTROLLER | 3.8k |
| RAM | 0 (SHARED) |
| I/F | 0 (SHARED) |
| WHOLE | 4.8k |

| INDEPENDENT CIRCUIT SIZE (NUMBER OF GATES) OF GF ($2^m$) | | |
|---|---|---|
| | m=160 | m=1024 |
| ARITHMETIC UNIT | 3.1k | 3.1k |
| CONTROLLER | 3.8k | 3.8k |
| RAM | 2.3k | 8.5k |
| I/F | 0.5k | 0.5k |
| WHOLE | ABOUT 10k | ABOUT 16k |

ARITHMETIC METHOD AND APPARATUS AND CRYPTO PROCESSING APPARATUS FOR PERFORMING MULTIPLE TYPES OF CRYPTOGRAPHY

BACKGROUND OF THE INVENTION

The present invention relates to an arithmetic method and apparatus and a crypto processing apparatus and, more particularly, to an arithmetic method and apparatus and a crypto processing apparatus which are suitably used for crypto coprocessors and the like implemented in, for example, IC cards and information electric home appliances.

In implementing an LSI for public-key cryptography, a cryptosystem for performing an integer based operation of the RSA (Rivest-Shamir-Adleman) system or the like have been mainly used. In this system, an operation must be performed for an integer with a large number of digits. For this reason, if this system is applied to an IC card or the like, a special-purpose processor is required. Many systems that implement such special-purpose coprocessors to realize long integer based operations for crypto processing have already been put into practice.

Recently, attention has been given to cryptosystems based on an algebraic system called a finite field $GF(2^m)$: Galois Field, especially elliptic curve cryptosystems of a finite field $GF(2^m)$, instead of integer based cryptosystems.

In this cryptosystem using a finite field $GF(2^m)$ arithmetic operation, the number of bits to be handled must be set to be as large as 160 or more as in an integer based operation system such as RSA. For this reason, if such a system is implemented on a device in which the performance of a CPU is low, e.g., an IC card, a relatively long processing time is required. Therefore, there are demands for an increase in the performance by using special-purpose hardware (coprocessors).

As described above, according to RSA as well as elliptic curve cryptography, special-purpose coprocessors must be prepared to realize high-speed crypto processing in IC cards and the like.

FIG. 23 shows the layout of an IC card LSI including a coprocessor for crypto processing. Referring to FIG. 23, in this LSI, a CPU, RAM, ROM, and EEPROM are integrated into one chip, and the coprocessor is comprised of a RAM, arithmetic section, and control section. The coprocessor assists the CPU in performing basic arithmetic operations for a public-key cryptography, e.g., a long exponentiation and the four fundamental operations of arithmetic under the control of the CPU.

FIG. 24 shows a coprocessor in the LSI shown in FIG. 23. In RSA, this component is implemented as an integer based multiplier for performing integer based operations.

In assembling an LSI of an elliptic curve cryptography, although the overall arrangement becomes identical or similar to that of the LSI shown in FIG. 23, a coprocessor for performing finite field $GF(2^m)$ arithmetic operations must be prepared instead of a coprocessor for performing integer based operations.

FIG. 25 is a block diagram showing the hardware arrangement of a coprocessor for performing finite field $GF(2^m)$ arithmetic operations with a polynomial base.

FIG. 25 shows a kind of arithmetic apparatus for a finite field $GF(2^m)$ called a cyclotomic field using the special irreducible polynomial disclosed in "Hardware Implementation of Elliptic Curve Cryptosystem", SCIS' 98-10. 1. C. This arithmetic apparatus has an arrangement capable of executing addition, square, multiply, and inverse operations on a finite field $GF(2^m)$. With this arrangement, a finite field $GF(2^m)$ arithmetic operation required to compute a point on an elliptic curve is executed. By integrating such an arithmetic apparatus into an IC, a coprocessor for finite field $GF(2^m)$ arithmetic operations which can be applied to the LSI in FIG. 23 can be obtained.

In this case, each of adder and multiplier circuits is constituted by $\underline{m}$ EX-ORs, and a multiplier circuit 81 is implemented by the circuit arrangement shown in FIG. 26.

FIG. 26 shows a finite field $GF(2^m)$ based multiplier circuit called a cyclotomic field.

The multiplier circuit 81 has m-bit input registers A and B. The multiplier circuit 81 inputs the coefficients of a polynomial a(x) as fixed values to the input register A and computes while shifting the coefficients of a polynomial b(x) from the most significant bit in response to respective clocks. Referring to FIG. 26, reference symbols D denote flip-flops constituting a feedback register. When $\underline{m}$ shifts are made, the values of the respective blocks D are loaded into an output register C, thus obtaining a(x)*b(x) as an operation result.

As is obvious from the comparison between the circuits shown in FIGS. 24 and 26, an integer based multiply operation and finite field $GF(2^m)$ arithmetic operation of a polynomial base totally differ in their architectures for executing multiply operations. Attempts have therefore been made to form different hardware arrangements for the respective cryptosystems.

For a finite field $GF(2^m)$ based modular multiplication in a fundamental operation for an elliptic curve cryptosystem, an arithmetic apparatus using a linear feedback shift register (LFSR) as a divide circuit using a polynomial f(x) on a finite of field $GF(q^m)$ is widely used. The modulo polynomial f(x) is:

$$f(x)=f_m x^m + f_{m-1} x^{m-1} + \ldots + f_1 x + f_0, f_m=1$$

FIG. 27 is a block diagram showing the arrangement of a linear feedback shift register LFSR. In this LFSR 90, EX-OR adders $91_1$ to $91_m$ and 1-clock delay elements (to be referred to as registers hereinafter) $92_1$ to $92_m$ are alternately cascaded from the input side. In this arrangement, the output extracted from the mth register $92_m$ is separately fed back to the $\underline{m}$ adders $91_1$ to $91_m$ through coefficient units $93_1$ to $93_m$.

This LFSR 90 operates on a unit time (clock) basis. In the shift register, advancing an operation clock pulse by one clock is referred to as making a shift, and a number $\underline{m}$ of registers $92_1$ to $92_m$ incorporated in the shift register is referred to as the number of stages of the shift register.

When q=2, a 1-bit flip-flop can be applied to each of the registers $92_1$ to $92_m$. Each of the coefficient units $93_1$ to $93_m$ multiplies "1" or "0". When 1 is multiplied, a corresponding coefficient unit is connected, whereas when 0 is multiplied, a corresponding coefficient unit is not connected. As each of the adders $91_1$ to $91_m$, a 2-input EX-OR is used.

In this LFSR 90, as the coefficients of a dividend polynomial are sequentially input from the input side (left side) from the higher orders, the coefficients of a quotient polynomial are sequentially output from the output side (right side) from higher orders. In this case, the contents of the respective registers (flip-flops) $92_1$ to $92_m$ upon completion of input of the 0th-order term of the dividend polynomial are the coefficients of a remainder polynomial.

In the arithmetic apparatus using the above LFSR 90, however, the registers $92_1$ to $92_m$ equal in number to the bits of a degree $\underline{m}$ are required, and hence the arrangement of the registers $92_1$ to $92_m$ is limited by the degree m. If, therefore, the degree m increases, the LFSR must be modified for each arithmetic apparatus.

Although attention is currently given to elliptic curve cryptosystems, RSA cryptosystems are still in the mainstream. It is therefore strongly required that even IC cards using elliptic curve cryptosystems comply with RAS cryptosystems.

When both a conventional integer based cryptosystem and a finite field GF(2^m) based cryptosystem are to be incorporated in the same IC card, coprocessors corresponding to the respective cryptosystems must be incorporated in the IC card according to the conventional techniques. If, however, two coprocessors are incorporated in the IC card, the chip area of the IC card, which is severely limited in terms of area, is undesirably reduced.

In a finite field GF(2^m) based modular multiplication, as the degree m increases, the LFSR must be modified for each arithmetic apparatus, thus imposing limitations in terms of hardware.

BRIEF SUMMARY OF THE INVENTION

It is an object of the present invention to provide an arithmetic method and apparatus and a crypto processing apparatus which can execute arithmetic operations without modifying the apparatus configurations even if a degree m of a finite field GF(2^m) increases.

It is another object of the present invention to provide an arithmetic apparatus and crypto processing apparatus which can execute a finite field GF(2^m) arithmetic operation as well as an integer based operation by only adding minimum architectures.

According to the present invention, there is provided an arithmetic apparatus which operates a unit arithmetic circuit while propagating a carry in an integer based unit arithmetic operation, and operating the unit arithmetic circuit without propagating any carry in a finite field GF(2^m) based unit arithmetic operation.

According to the present a finite field GF(2^m) arithmetic operation can be executed as well an integer based operation by only adding a minimum architecture.

According to the present invention, there is provided an arithmetic apparatus comprising an integer based unit arithmetic circuit, a finite field GF(2^m) based unit arithmetic circuit logically adjacent to the integer based unit arithmetic circuit, and a selector for selecting the integer based unit arithmetic circuit or the finite field GF(2^m) based unit arithmetic circuit.

According to the present invention, both an integer based unit multiply operation and a finite field GF(2^m) based multiply operation can be executed by only adding a finite field GF(2^m) based unit arithmetic circuit.

According to the present invention, the arithmetic apparatus comprises an integer based unit arithmetic circuit and a selection control circuit which outputs, to the integer based unit arithmetic circuit, and a selection signal for selecting an integer based unit arithmetic operation or a finite field GF(2^m) based unit arithmetic operation. In addition, the integer based unit arithmetic circuit comprises a carry propagation control circuit which, in executing a long product-sum operation, propagates a carry upon reception of a selection signal instructing an integer based unit arithmetic operation, and propagates no carry upon reception of a selection signal instructing a finite field GF(2^m) based unit arithmetic operation. In this apparatus, the integer based arithmetic mode and finite field GF(2^m) based arithmetic mode can be switched by controlling carry propagation in the unit arithmetic circuit.

According to the present invention, both an integer based arithmetic operation and finite field GF(2^m) based arithmetic operation can be executed by only adding the carry propagation control circuit.

According to the present invention, there is provided an arithmetic apparatus comprising a carry propagation control circuit which performs carry propagation control in a full adder in units of bits by using a switch to which a selection signal and carry out signal are input.

In the arithmetic apparatus of the present invention, the carry propagation control circuit comprises a selector which switches between outputting an EX-OR result of two inputs in a full adder in units of bits as an addition result and outputting an EX-OR result of the result c and an input carry as an addition result.

According to the present invention, there is provided an arithmetic apparatus comprising an adder circuit for adding by propagating a carry when executing an integer based multiply operation, and adding without propagating any carry when executing a finite field GF(2^m) based multiply operation.

According to the present invention, both an integer based multiply operation and finite field GF(2^m) based arithmetic operation can be reliably executed with respect to an addition portion of a product-sum operation.

According to the present invention, there is provided a crypto processing apparatus capable of switching between encryption or decryption based on an integer based operation performed by an arithmetic apparatus and encryption or decryption based on a finite field GF(2^m) based arithmetic operation performed by the arithmetic apparatus.

The present invention can perform both crypto processing based on an integer based operation such as an RSA crypto operation and crypto processing based on a finite field GF(2^m) based arithmetic operation such as an elliptic curve crypto operation.

According to the present invention, there is provided an arithmetic apparatus comprising an arithmetic section including a long product-sum operation circuit capable of executing a modular multiplication with a polynomial base expression of a finite field GF(2^m) and a control section which controls the product-sum operation circuit to execute a modular multiplication upon dividing the modulo into a multiply processing and a modulo processing.

According to the arithmetic apparatus of the present invention, since the long product-sum operation circuit performs a modulo instead of a linear feedback shift register, an arbitrary degree equal to or larger than 1 can be used. Even if, therefore, the degree of a finite field GF(2^m) increases, an arithmetic operation can be executed without modifying the apparatus configuration.

According to the present invention, the product-sum operation circuit comprises a single precision multiplier circuit for multiplying polynomial data of a finite field GF(2^m) based polynomial base without propagating any carry, and a double precision adder circuit for adding by using the multiply result obtained by the multiplier circuit, and the control unit controls the multiplier circuit and adder circuit in multiply processing.

According to the present invention, there is provided an arithmetic apparatus comprising a quotient acquisition circuit which is controlled by the control unit, sets the multiply result of two polynomial data as first dividend polynomial data in a modulo, sets predetermined modulo polynomial data as divisor polynomial data, performs quotient calculation on the basis of the first or subsequent dividend polynomial data and divisor polynomial data, and acquires 1-block quotient polynomial data with the number of bits corresponding to a bus width from an upper order. In this arithmetic apparatus, the control unit controls the quotient acquisition circuit in a modulo, and controls the multiplier circuit and adder circuit when 1-block quotient polynomial data is acquired. With this operation, next dividend polynomial data is calculated by subtracting the multiply result of the 1-block quotient polynomial data and divisor polynomial data from the current dividend polynomial data, and the processing, from controlling the quotient acquisition circuit to calculating dividend polynomial data, is repeated, thereby obtaining residue data.

In this arithmetic apparatus, every multiply result of 1-block quotient polynomial data and divisor polynomial data becomes (m+1) blocks.

In addition, this multiply result is subtracted (=added) from the current dividend polynomial to calculate the next dividend polynomial data of (2m−1*n) blocks (n is the number of times of multiply operations). That is, the previous dividend polynomial data is decreased in units of blocks.

With the above control unit, the present invention can realize efficient modulo and quotient calculation by utilizing the characteristics of hardware.

In a quotient calculation, the quotient acquisition circuit of the arithmetic apparatus of the present invention multiplies the inverse data of the upper two blocks of divisor polynomial data and the current dividend polynomial data, and sets the second upper block of the multiply result as 1-block quotient polynomial data.

With the above quotient acquisition circuit, the present invention can extract an effective number portion from the obtained quotient polynomial, and hence can optimize operation precision.

According to the present invention, there is provided an arithmetic apparatus comprising a quotient acquisition circuit for calculating inverse data from the upper two blocks of divisor polynomial data and storing the data in a memory when acquiring quotient polynomial data in a first operation, and reading out the inverse data from the memory and using it when acquiring quotient polynomial data in a second or subsequent operation.

According to the present invention, with the above quotient acquisition circuit, when redundant modulo is executed under the same modulo polynomial, a quotient can be acquired by reading out inverse data from the memory. Therefore, the time required to calculate inverse data can be saved in the second and subsequent quotient calculations, and the processing time for a finite field $GF(2^m)$ arithmetic operation can be shortened. In addition, since inverse data can be calculated in advance, a finite field $GF(2^m)$ based modular multiplication can be realized by using only the product-sum operation circuit for performing multiply and addition operations.

According to the present invention, there is provided an arithmetic apparatus comprising a quotient acquisition circuit for, in calculating inverse data, counting the number of consecutive 0s from high-order bits of the upper two blocks of divisor polynomial data, extracting polynomial data of 1 block+1 bit from high-order bits such that the most significant bit is set to 1, obtaining the inverse of the extracted polynomial data, obtaining 2-block data as a whole by concatenating corrected data whose least significant bit is 1 and other bits are 0 to the most significant bit of the obtained inverse, and setting, as inverse data, a result obtained by bit-shifting the data to the high-order side by the count of 0s.

With the above quotient acquisition circuit, the present invention uses a corrected value as inverse data to avoid normalization of a divisor, correction of an approximate quotient, and denormalization of an operation result such as a quotient or residue based on the Knuth algorithm (reference: Knuth, D. E., "The Art of Computer Programming", Vol. 2, Reading, Mass.: Addison Wesley, 2nd edition, (1981)) using a single precision divide operation used for a general long integer based divide operation. The number of times of bit shifts can therefore be decreased, and the arithmetic apparatus can be optimized.

According to the present invention, there is provided a crypto processing apparatus for encrypting or decrypting based on a finite field $GF(2^m)$ based modular multiplication by the arithmetic apparatus.

With the arithmetic apparatus, the present invention can encrypt or decrypt based on a finite field $GF(2^m)$ based modular multiplication such as an elliptic curve crypto operation.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 3A, 3B, 3C and 3D are views showing an example of the arrangement of a 4*4-bit unit arithmetic circuit which implements an integer based multiply operation;

FIG. 17 is a view showing the required numbers of clocks for commands in the third embodiment;

FIG. 18 is a view showing the required numbers of clocks for $GF(2^{160})$ operations in the third embodiment;

FIG. 19 is a view showing the circuit sizes of coprocessors in the third embodiment;

FIG. 20 is a view showing additional circuit sizes in the third embodiment;

DETAILED DESCRIPTION OF THE INVENTION

Each embodiment of the present invention will be described below with reference to the views of the accompanying drawing.

First Embodiment

Figure 1:
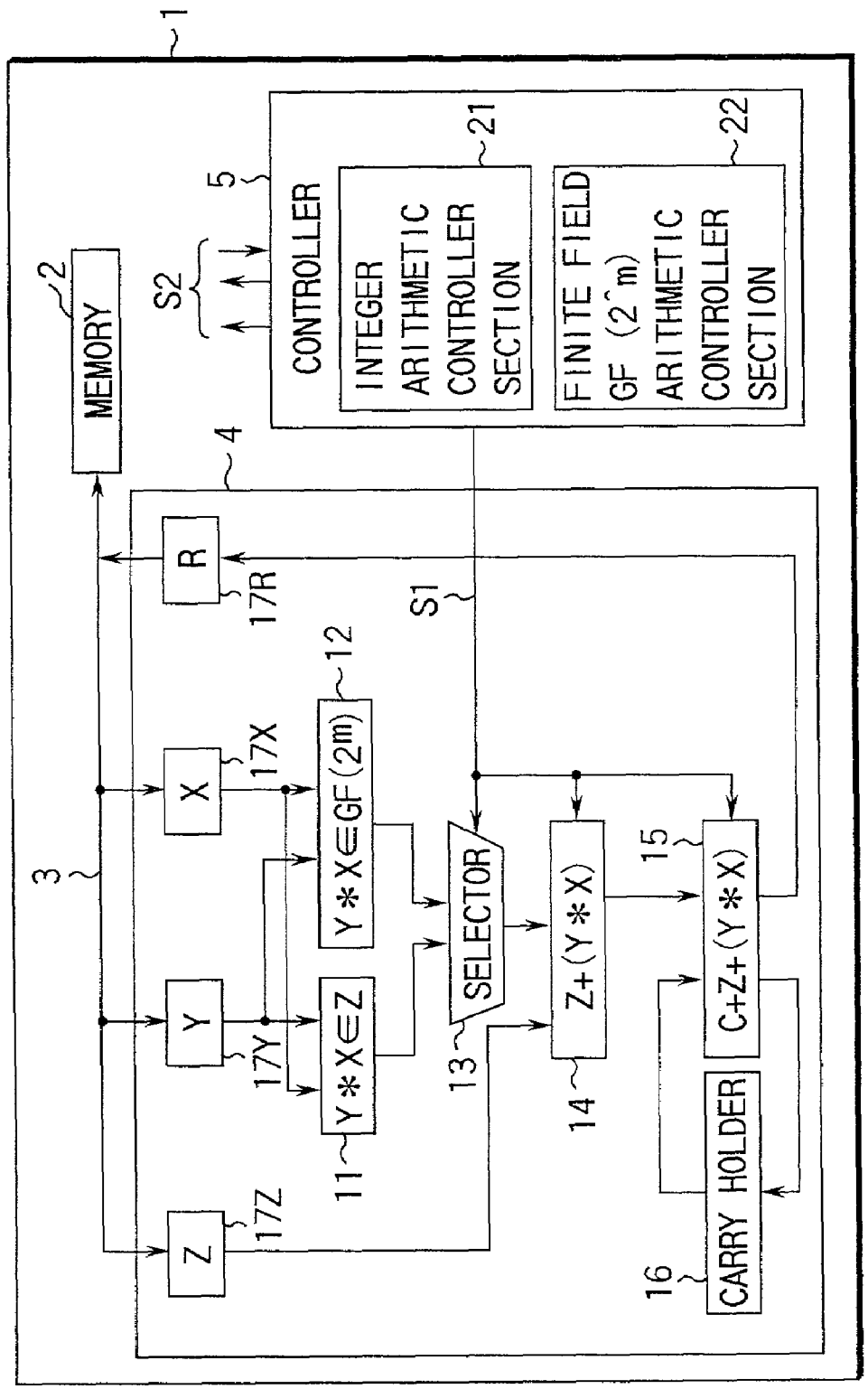
FIG. 1 is a block diagram showing an example of the arrangement of an arithmetic apparatus according to the first embodiment of the present invention.

FIG. 1 is a block diagram showing an example of the arrangement of an arithmetic apparatus according to the first embodiment of the present invention.

An arithmetic apparatus of this embodiment which is formed as a coprocessor 1 is a long product-sum multiplier apparatus capable of both an integer based multiply operation and a finite field $GF(2^m)$ based multiply operation. This apparatus executes other operations such as addition, square, and inverse operations by controlling this multiply processing. By incorporating this arithmetic apparatus in an LSI or the like, a crypto processing apparatus capable of realizing both an RSA cryptosystem and elliptic curve cryptosystem is formed. In this case, for example, the LSI in which the arithmetic apparatus is to be incorporated is the apparatus shown in FIG. 23.

In this coprocessor 1, an arithmetic unit 4 is controlled by a controller unit 5 to input/output data, through a 32-bit data bus 3, to/from a memory 2 for storing data in the process of an operation.

Input data from the data bus 3 is stored in buffers 17Z, 17Y, and 17X, and output data to the data bus 3 is stored in a buffer 17R.

Input data X and Y are multiplicand/multiplier data. Of these data, the data Y is input to a buffer as data divided in units of predetermined digits to prevent a multiply operation of many digits from being performed at once. Data Z is an interim result which is produced because a multiply operation is executed in a plurality of steps. This data is added to the product of XY, and overflow called a carry C is added to the sum, thus completing one cycle. Data R obtained by removing the carry from the resultant data is output to the data bus 3 through the buffer R to be used as the data Z for an operation in the next cycle. By repeating this cycle a plurality of number of times, a long integer multiply operation or finite field $GF(2^m)$ based multiply operation ("c'" to be described later in a strict sense) is performed.

To realize the above operation, in addition to the buffers 17X, 17Y, 17Z, and 17R, the coprocessor 1 includes an integer based multiplier circuit 11, a finite field $GF(2^m)$ based multiplier circuit 12, a selector 13, an adder circuit 14, an adder circuit 15, a carry holder 16, and the controller unit 5.

The integer based multiplier circuit 11 performs an integer based multiply operation for the data X in a buffer 17X and the data Y in a buffer 17Y, and outputs the result to the selector 13.

The finite field $GF(2^m)$ based multiplier circuit 12 executes part (c') of a finite field $GF(2^m)$ based multiply operation by using the data X in the buffer 17X and the data Y in the buffer 17Y, and outputs the result to the selector 13.

The selector 13 outputs the data output from the integer based multiplier circuit 11 or finite field $GF(2^m)$ based multiplier circuit 12 to the adder circuit 14 in accordance with a signal S1 from the controller unit 5.

The adder circuit 14 is a full adder, which adds the data Z in the buffer 17Z to the selector output and outputs the sum to the adder circuit 15. In this adder circuit 14, integer based addition and finite field $GF(2^m)$ based addition are switched in accordance with the control signal S1. This addition switching will be described later.

The adder circuit 15 adds the carry C held in the carry holder 16 to the output from the adder circuit 14. The adder circuit 15 then outputs the upper 32 bits of the sum as the next carry C to the carry holder 16, and also outputs, to a buffer 17R, the lower 8 bits as the data R which is the operation result in this cycle. In the adder circuit 15 as well, integer based addition and finite field $GF(2^m)$ based addition are switched in accordance with the control signal S1.

The carry holder 16 holds the carry C output from the adder circuit 15, and supplies the held carry C to the adder circuit 15 in the next operation cycle.

The controller unit 5 comprises an integer arithmetic controller 21 and finite field $GF(2^m)$ arithmetic controller 22. The controller unit 5 controls the arithmetic unit 4 in accordance with one of these command groups. This command switching is performed in accordance with a command from an external CPU (e.g., the CPU in FIG. 23).

The integer arithmetic controller 21 controls the arithmetic unit 4 to make it operate as a long integer based multiplier. For this purpose, the control signal S1 controls the selector 13 to output the data from the integer based multiplier circuit 11 to the adder circuit 14, and also controls the adder circuits 14 and 15 to make them operate as an integer based adder circuit. The integer arithmetic controller 21 executes other arithmetic processes such as the four fundamental operations of arithmetic by controlling the operation of the arithmetic unit 4 as an integer based multiplier.

The finite field GF(2^m) arithmetic controller 22 controls the arithmetic unit 4 to operate as a finite field GF(2^m) based multiplier. For this purpose, the control signal S1 controls the selector 13 to output the data output from the integer based multiplier circuit 11 to the adder circuit 14, and also controls the adder circuits 14 and 15 to make them operate as a finite field GF(2^m) based adder circuit. In addition, the finite field GF(2^m) arithmetic controller 22 realizes addition and square operations by controlling the operation of the arithmetic unit 4 as a finite field GF(2^m) based multiplier.

In order to realize the respective processes described above, the controller unit 5 controls the respective sections by outputting a control signal S2.

The operation of the arithmetic apparatus according to this embodiment having the above arrangement will be described next.

In this arithmetic apparatus (coprocessor 1), the multiplier circuit 12, selector 13, and the like are incorporated in the integer based multiplier apparatus to realize the processing to be performed by a finite field GF(2^m) based multiplier apparatus. In this case, according to a finite field GF(2^m), an (m−1)-order polynomial can be expressed using an m-bit vector by:

$$a(x) = a_{m-1}x^{m-1} + a_{m-2}x^{m-2} + \ldots + a_1x + a_0$$

$$= [a_{m-1}, \ldots, a_1, a_0] \quad (1)$$

$$b(x) = b_{m-1}x^{m-1} + b_{m-2}x^{m-2} + \ldots + b_1x + b_0$$

$$= [b_{m-1}, \ldots, b_1, b_0] \quad (2)$$

In this case, a finite field GF(2^m) based multiply operation is a modular multiplication with an m-order irreducible polynomial f(x) on GF($2^m$) being set as a modulus. In addition, a product c(x) of two unknowns a(x) and b(x) of the extension of field 2 is defined as:

$$c(x) = a(x) \cdot b(x) \bmod f(x)$$

$$= \Sigma a_k x^k \cdot b(x) \bmod f(x)$$

$$= c_{m-1}x^{m-1} + c_{m-2}x^{m-2} + \ldots + c_1x + c_0$$

$$= [c_{m-1}, \ldots, c_1, c_0] \quad (3)$$

In addition, a modulo polynomial f(x) can be expressed as:

$$f(x) = f_m x^m + f_{m-1}x^{m-1} + \ldots + f_1 x + f_0 \quad (4) =$$

$$= [f_m, f_{m-1}, \ldots, f_1, f_0] \quad (4)$$

Figure 26:
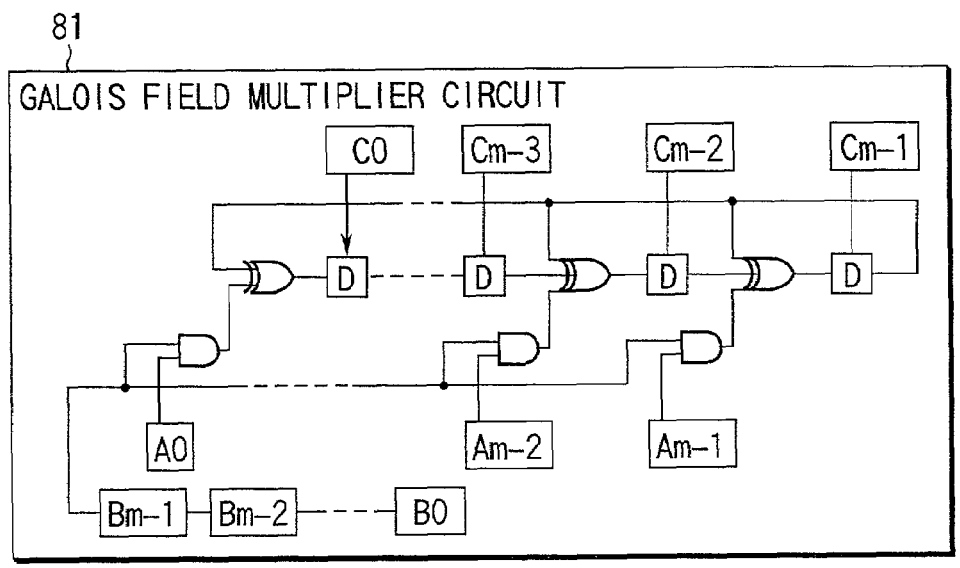
FIG. 26 is a block diagram showing a finite field $GF(2^m)$ based multiplier circuit called a cyclotomic field.

In a general finite field GF(2^m) based polynomial multiply operation, as shown in FIG. 26, a shift register based on multiplier cycle shift operation is formed, and a residue polynomial after m cycle shifts is set as a multiply result. In this embodiment, however, this processing is performed by slightly modifying a long product-sum operation circuit widely used in an integer based crypto processing LSI.

Note that when the coprocessor 1 operates as an integer based arithmetic apparatus in accordance with the control signal S1 from the controller unit 5, this arithmetic apparatus functions as a long product-sum operation circuit. In this long product-sum operation circuit, the finite field GF(2^m) based multiplier circuit 12 calculates equation (5) as part of a finite field GF(2^m) based multiply operation upon switching based on the control signal S1.

$$c'(x) = a(x) \cdot b(x) \quad (5)$$

Note that the finite field GF(2^m) based multiplier circuit 12 does not calculate the portion "c(x)'mod f(x)" in equation (6) in the step of calculating c'. That is, c' itself is computed in the same manner as the product of two numbers in an integer based multiply operation by only switching the multiplier circuit 12 and adder circuits 14 and 15 using the control signal S1.

Note that the m-bit multiplier and multiplicand of c'(x)=a(x)·b(x) are divided into 32-bit data and read out from the memory, and the operation result is written in the memory in units of 32 bits. The final operation result becomes 2m-bit data.

The integer based operation performed by the integer based multiplier circuit 11 differs from the finite field GF(2^m) based polynomial operation performed by the finite field GF(2^m) based multiplier circuit 12 in the presence/absence of a carry. In the integer based operation, a logic expression of addition is:

$$0+0+\text{Carry}(=0)=0, \text{Carry}=0$$

$$1+0+\text{Carry}(=0)=1, \text{Carry}=0$$

$$1+1+\text{Carry}(=0)=0, \text{Carry}=1 \quad (6)$$

In this manner, the operation must consider a carry from a lower bit. In contrast to this, in a finite field GF(2^m) based algebraic system, since each bit indicates the coefficient of each term of a polynomial, no consideration needs of to be given to a carry to a different order.

In consideration of this, in this embodiment, each integer based arithmetic unit (multiplier or adder) is switched between the normal mode of allowing carry propagation and the mode of executing no carry propagation. In this case, the mode of inhibiting (not executing) carry propagation is used to perform finite field GF(2^m) arithmetic operation. The size of a circuit to be added to switch the carry propagation modes is small as compared with the total circuit size.

Figure 2A:
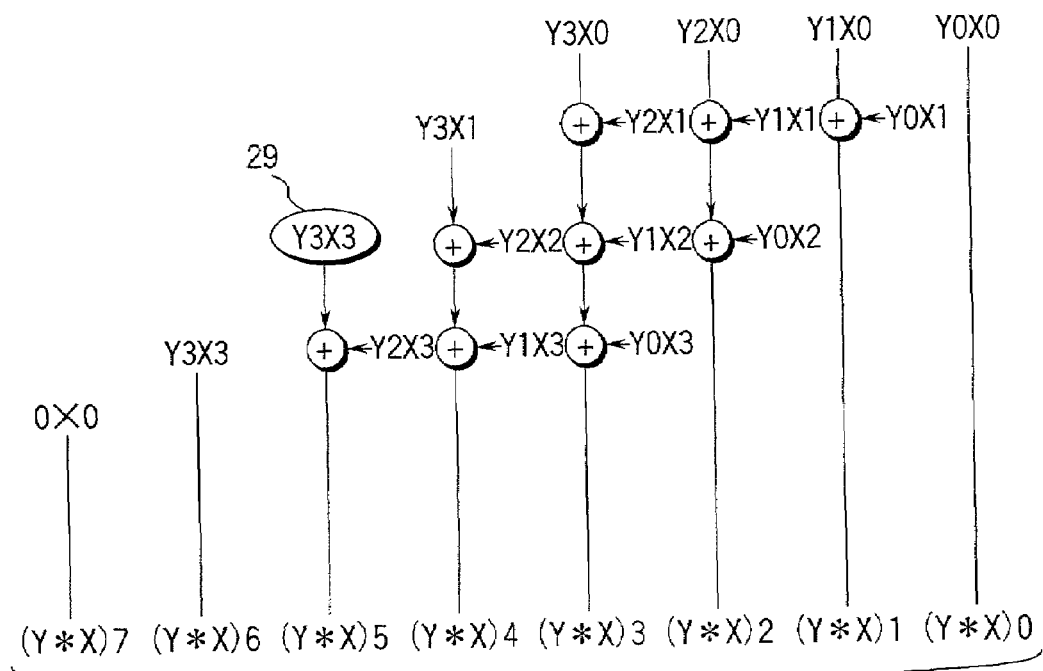
FIGS. 2A, 2B, and 2C are views showing an example of the arrangement of a 4*4-bit unit arithmetic circuit which implements c'(x)=a(x)*b(x)
Figure 2B:
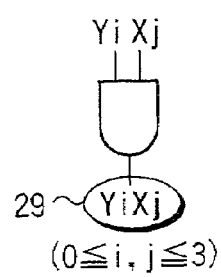
Figure 2C:
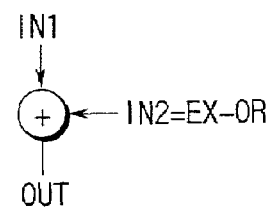

FIGS. 2A, 2B, and 2C show an example of the arrangement of a 4*4-bit unit arithmetic circuit that implements c'(x)=a(x)·b(x).

The finite field GF(2^m) based multiplier circuit 12 in FIG. 1 is obtained by forming the unit operation device shown in FIG. 2A into a 8*32-bit arrangement. Note that the circuit shown in FIG. 2B corresponds to an input section 29 of the circuit in FIG. 2A.

FIGS. 3A, 3B, 3C, and 3D show an example of the arrangement of a 4*4-bit unit arithmetic circuit that implements an integer based multiply operation.

The integer based multiplier circuit 11 shown in FIG. 1 is obtained by forming the unit arithmetic apparatus in FIGS. 3A to 3D into a 8*32-bit arrangement. FIG. 3C shows the arrangement of a full adder FA used in FIG. 3A. FIG. 3D shows the arrangement of a carry 31 of the full adder FA in FIG. 3C. FIG. 3B shows an input section 30 of the circuit in FIG. 3A.

In the arithmetic apparatus of this embodiment, the finite field GF(2^m) based multiplier circuit 12 and integer based multiplier circuit 11 are logically adjacent to each other, and these circuits 11 and 12 are selected in accordance with the control signal S1 generated from a finite field GF(2^m) arithmetic operation command from the controller unit 5, thereby performing appropriate processing.

An output from the selector 13 is input to the adder circuit 14. In this case, the Z+(Y*X) adder circuit 14 is a full adder for adding 40-bit data (Y*X) and 8-bit data Z. In this case as well, finite field GF(2^m) based addition is realized by adding a switch for inhibiting a carry of the result obtained by adding the respective bits from being propagated to the next stage in accordance with the above control signal.

Figure 4:
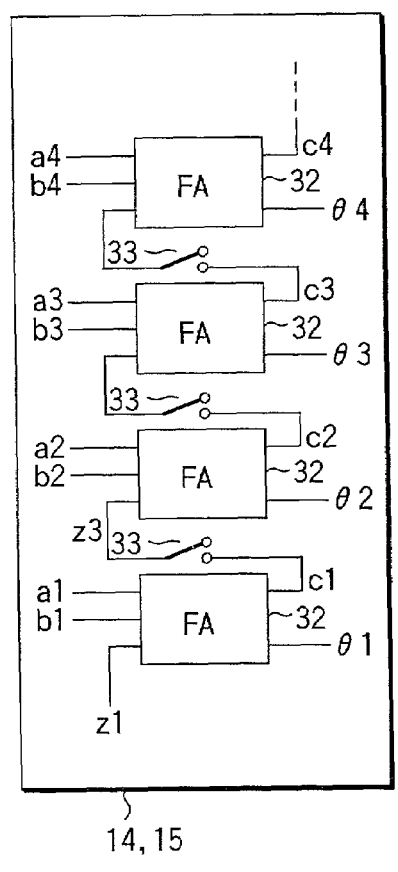
FIG. 4 is a block diagram showing an example of the arrangement of a 4-bit ripple carry type full adder with a carry control function which is used in the coprocessor of the first embodiment.

FIG. 4 is a block diagram showing an example of the arrangement of a 4-bit ripple carry type full adder having a carry control function which is used in the coprocessor in this embodiment.

The adder circuit 14 shown in FIG. 1 is obtained by extending the full adder having this arrangement into a circuit capable of adding 40-bit data and 8-bit data.

In the circuit shown in FIG. 4, switches 33 are arranged between full adders 32 to control carry propagation.

Figure 5:
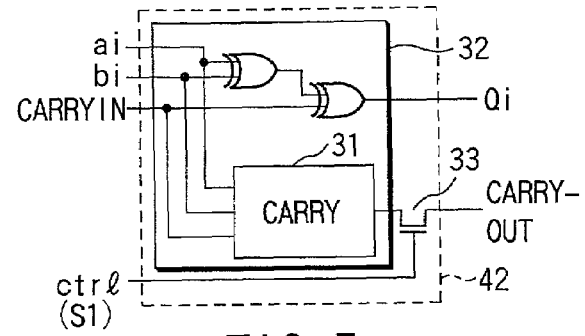
FIG. 5 is a circuit diagram showing an example of the arrangement of a full adder and carry control switch which are used in an adder circuit in the first embodiment.

FIG. 5 shows an example of the arrangement of a full adder and carry control switch which are used in the adder circuit in this embodiment.

The full adder 32 and switch 33 constitute a full adder 42 having a carry control function for one bit. In this case, the full adder 32 has the same arrangement as that of the full adder FA in FIG. 3C, and the carry 31 in the full adder 32 has the same arrangement as that of the carry in FIG. 3D.

The switch 33 connected to a carry propagation line in the full adder 32 is controlled by the control signal S1 from the controller unit 5. When an integer based operation is to be performed, the switch 33 is connected. When a finite field GF(2^m) arithmetic operation is to be performed, the switch 33 is disconnected.

The output (Z+(Y*X)) from the adder circuit 14 having the above arrangement is propagated to the adder circuit 15.

The C+Z+(Y*X) adder circuit 15 on the last stage of the arithmetic operation block outputs the lower 8 bits of the 40 bits as the multiply result as the data R, and adds the upper 32 bits to Z+(Y*X) in the next cycle.

Similar to the adder circuit 14, the adder circuit 15 is a full adder having a carry control function shown in FIG. 4 which is controlled by the control signal S1. Therefore, in the integer based operation mode, the adder circuit 15 serves as a full adder adjusted to the LSB to execute integer based addition. In the finite field GF(2^m) arithmetic operation mode, the adder circuit 15 executes finite field GF(2^m) based addition.

The output data R from the adder circuit 15 is temporarily stored in the memory 2 through the data bus 3. This data becomes the data Z again and returns to the coprocessor 1, and an integer based multiply operation or finite field GF(2^m) based multiply operation is continued. This operation is repeated by the number of times corresponding to the required number of cycles, thereby obtaining a multiply result.

In this case, the result of equation (5) can be obtained in accordance with a finite field GF(2^m) based multiply command, and a finite field GF(2^m) based multiply operation is completed by a modular multiplication with the irreducible polynomial f(x) as a modulus, as defined by equation (6). Similar to division on paper, the modular multiplication may be performed by repeating the processing of acquiring a quotient from the upper digits of a dividend and subtracting the current dividend from the product of the current quotient and a divisor (in an extension field of 2, subtraction and addition are performed in the same manner) by the number of times corresponding to the required number of cycles.

This processing can be realized by executing a finite field GF(2^m) based multiply command and addition command (this operation will be described in detail in the third embodiment). A finite field GF(2^m) based square operation can be realized by the same processing as that for a multiply operation. An inverse operation can be realized by mutually repeating multiply and square operations.

A case wherein the arithmetic unit 4 functions as a finite field GF(2^m) based adder in accordance with a finite field GF(2^m) based addition command will be described below.

Similar to general polynomial addition, finite field GF(2^m) based addition is performed by adding the coefficients of the same order as per $$c(x)=a(x)+b(x)$$

$$=[a_{m-1}+b_{m-1}, a_{m-2}+b_{m-2}, \ldots, a_0+b_0] \quad (7)$$

In this case, the sum of the coefficients of the respective orders is 0+0=1+1=0 and 0+1=1+0=1, and hence, no carry is produced unlike in integer based addition. Therefore, finite field GF(2^m) based addition can be generally implemented by $m$ EX-ORs.

In an integer based multiplier apparatus, addition can be handled as c=b+a*1. In this embodiment, therefore, finite field GF(2^m) based addition is also executed as c(x)=b(x)+a(x)*1 by using this algorithm without any change. This arithmetic operation can be realized by switching based on the control signal S1 because the full adders shown in FIG. 4 are used for the adder circuits 14 and 15.

Figure 24:
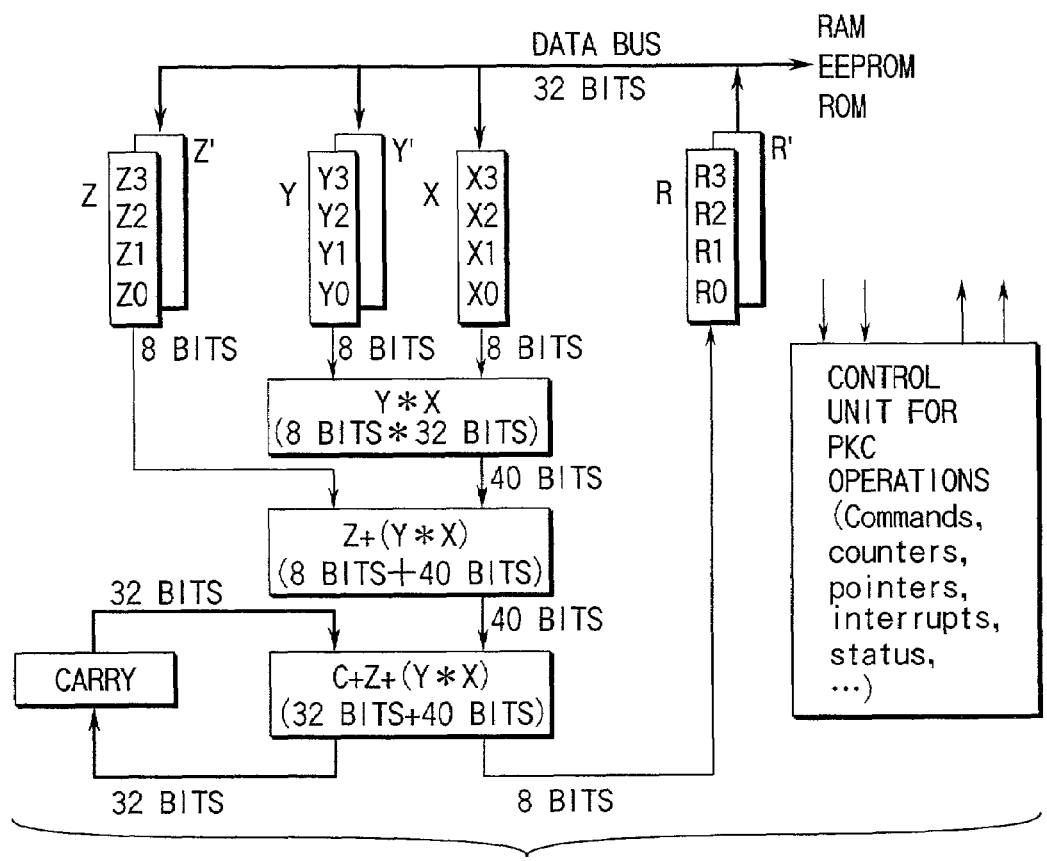
FIG. 24 is a block diagram showing an example of the arrangement of a coprocessor portion of an LSI for performing an integer based operation.
Figure 25:
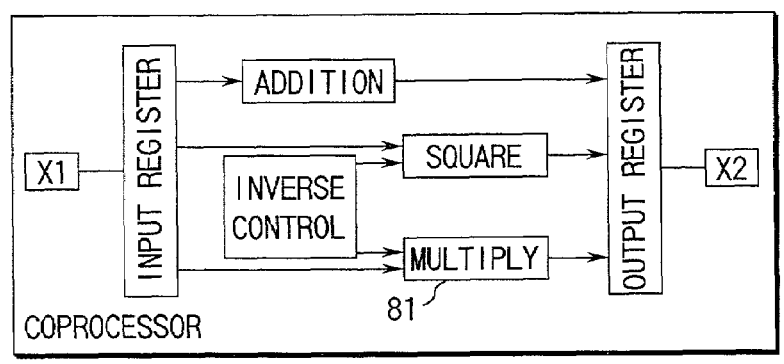
FIG. 25 is a block diagram showing an example of the hardware arrangement of a coprocessor for performing a finite field $GF(2^m)$ arithmetic operation of a polynomial base.

In addition, with switching operation using the control signal S1, the coprocessor 1 becomes a circuit having the same function as that of the coprocessor shown in FIG. 24, thus realizing an integer based operation as well.

As described above, in the arithmetic apparatus according to this embodiment of the present invention, the integer based multiplier device includes the unit multiplier device for an integer based multiply operation and the unit arithmetic device for a finite field GF(2^m) based multiply operation, which has a circuit arrangement similar to that of the unit multiplier apparatus, and a finite field GF(2^m) arithmetic operation command is added to an integer based multiply command. In addition, this apparatus includes the selector controlled by a control signal generated from a finite field GF(2^m) arithmetic command and the switch for controlling the propagate of a carry out of each bit of the full adder. The arithmetic apparatus of the present invention can therefore execute both integer based operation and finite field GF(2^m) arithmetic operation without using any sequential finite field GF(2^m) based multiplier device using a conventional shift register.

A public-key crypto processing accelerator capable of executing finite field GF(2^m) based addition and multiply operations using a long product-sum operation circuit can therefore be provided by adding small numbers of instructions and circuits as additional extension functions to a conventional integer based arithmetic unit. Note that the circuit size required to realize this embodiment is small as compared with the total circuit size.

According to the crypto processing apparatus of this embodiment, an LSI having abundant functions capable of handling the finite field GF(2^m) based elliptic curve cryptosystem as well as the integer based RSA system can be provided as a crypto processing coprocessor without specifically increasing the packing area. An encryption/decryption apparatus capable of handling both RSA and elliptic curve cryptosystem can be implemented in even an apparatus having a small packing area, such as an IC card.

Full adders which have carry control functions and constitute the adder circuits 14 and 15 shown in FIG. 4 will be described.

Figure 6:
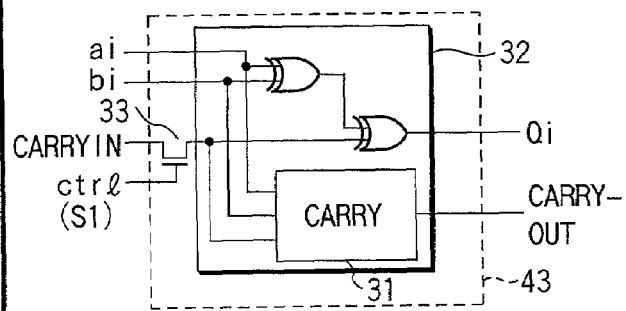
FIG. 6 is a circuit diagram showing a modification of the full adder with the carry control function.

FIG. 6 shows another full adder having a carry control function.

Like the circuit in FIG. 5, this full adder 43 having the carry control function comprises a switch 33 and full adder 32. In the circuit in FIG. 6, however, the switch 33 is provided on the input side of a carry 31 unlike in the circuit in FIG. 5, in which the switch 33 is provided on the output side of the carry 31.

Figure 7:
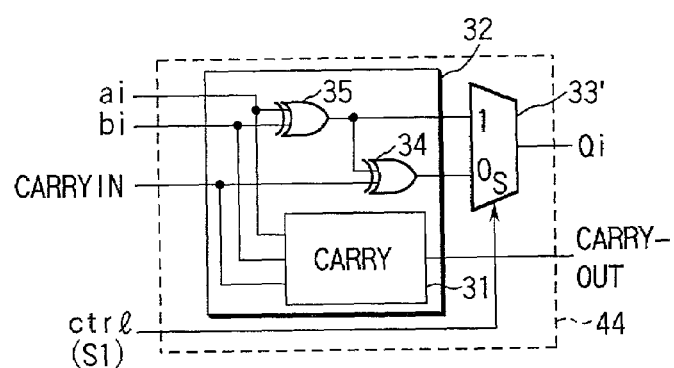
FIG. 7 is a circuit diagram showing another modification of the full adder with the carry control function.

FIG. 7 shows still another full adder having a carry control function.

This full adder 44 having the carry control function performs carry control by controlling selection of an addition result as an output. More specifically, a switch 33' is a selector, which selects an output from an EX-OR 35 or EX-OR 36 on the basis of the control signal S1. A ripple carry type full adder obtained by connecting such full adders can control carry propagation in accordance with the control signal S1.

Assume that the control signal S1 in FIG. 7 is a control signal based on a finite field GF(2^m) arithmetic operation command. In this case, if the signal S1 is "1", outputs a and b from the EX-OR 35 become operation results. As a consequence, the full adder 44 functions as a finite field GF(2^m) based adder. If the signal S1 is "0", an output from the full adder 44 becomes an operation result. As a consequence, the full adder 44 functions as an integer based adder.

Second Embodiment

Figure 8:
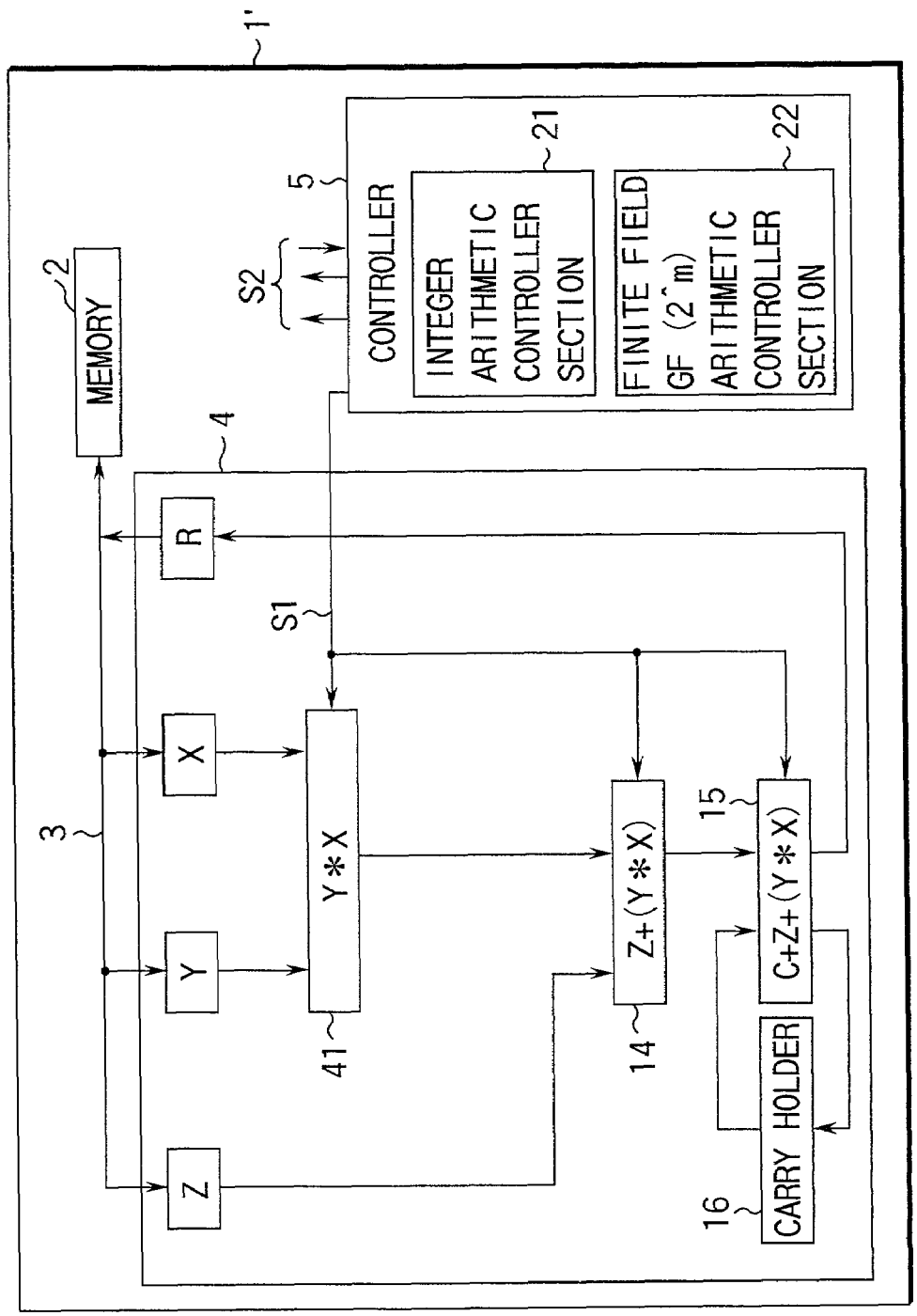
FIG. 8 is a block diagram showing an example of the arrangement of an arithmetic apparatus according to the second embodiment of the present invention.

FIG. 8 shows an example of the arrangement of an arithmetic apparatus according to the second embodiment of the present invention. The same reference numerals as in FIG. 1 denote the same parts in FIG. 8, and a description thereof will be omitted. Only different portions will be described below. Note that a repetitive description will be avoided in each embodiment described below.

A coprocessor 1' as this arithmetic apparatus has the same arrangement as that in the first embodiment except that it has a multiplier circuit 41 in place of the integer based multiplier circuits 11, finite field GF(2^m) based multiplier circuit 12, and selector 13 in FIG. 1.

This multiplier circuit 41 is designed to switch the inter based multiply mode and the finite field GF(2^m) based multiply mode (only c' in equation (6)) in accordance with a control signal S1 from a controller unit 5.

Figure 9A:
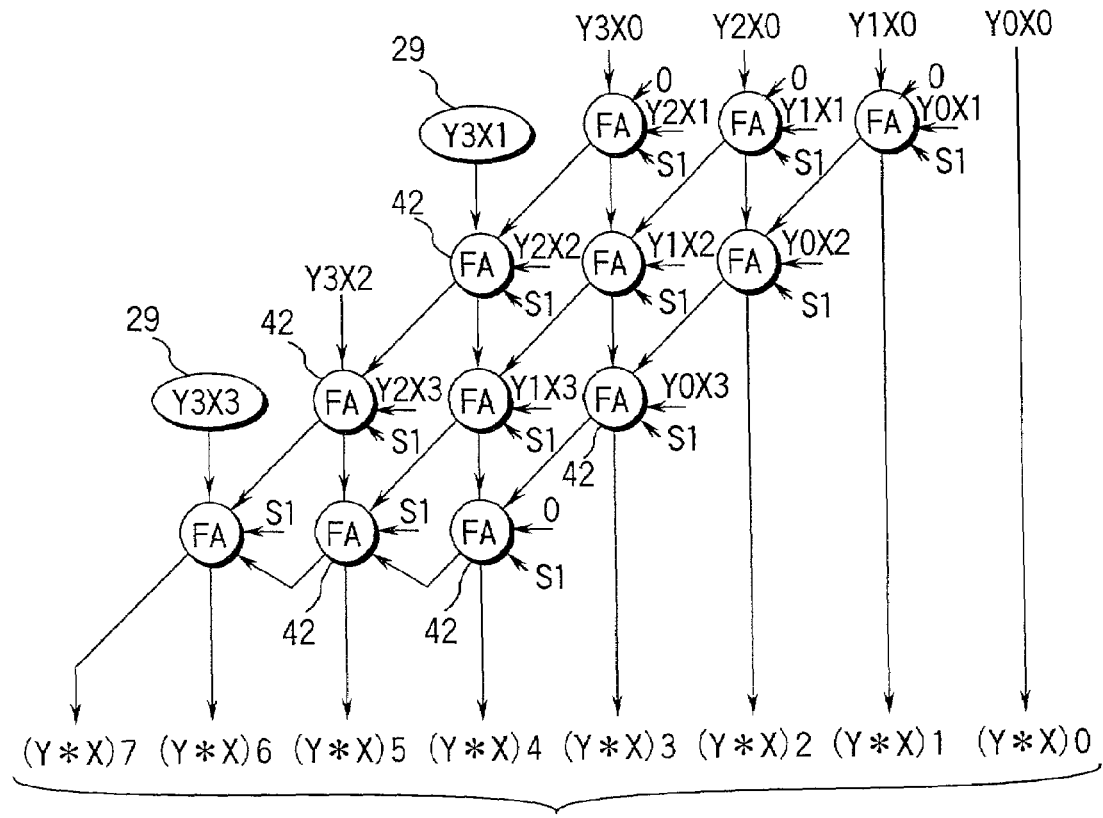
FIGS. 9A and 9B are views showing an example of the arrangement of 4*4-bit unit arithmetic circuit which implements a multiplier circuit in the second embodiment.
Figure 9B:
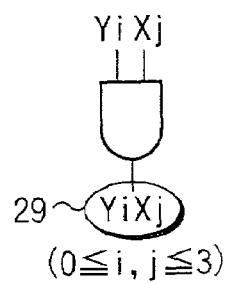

FIGS. 9A and 9B show an example of the arrangement of a 4*4-bit unit arithmetic circuit for realizing the multiplier circuit of this embodiment. In practice, the multiplier circuit 41 is realized by forming the unit arithmetic device shown in FIGS. 9A and 9B into a device having an 8*32-bit configuration. The circuit in FIG. 9B shows an input section 29 of the circuit in FIG. 9A.

As shown in FIG. 9A, the multiplier circuit 41 uses the full adder 42 having the carry control function in FIG. 5 as a full adder, and hence can control carry propagation in accordance with the control signal S1. Switching of the integer based multiply mode and finite field GF(2^m) based multiply mode can be realized by a finite field GF(2^m) arithmetic operation command.

The arithmetic apparatus of this embodiment can therefore operate in a manner similar to the first embodiment.

As described above, the arithmetic apparatus and crypto processing apparatus according to this embodiment of the present invention uses the multiplier circuit 41 in place of the integer based multiplier circuit 11 and finite field GF(2^m) based multiplier circuit 12, and selector 13, and implements the functions of the circuits 11, 12, and 13 by using one circuit 41. In addition to effects similar to those of the first embodiment, this embodiment can switch between the integer based multiply operation and finite field GF(2^m) based multiply operation by using fewer additional circuits.

In this embodiment, the full adder shown in FIG. 5 is used as the full adder 42 having the carry control function. However, the full adder 43 or 44 having a carry control function shown in FIG. 6 or 7 may be used instead of the full adder 42 having a carry control function.

Third Embodiment

Figure 10:
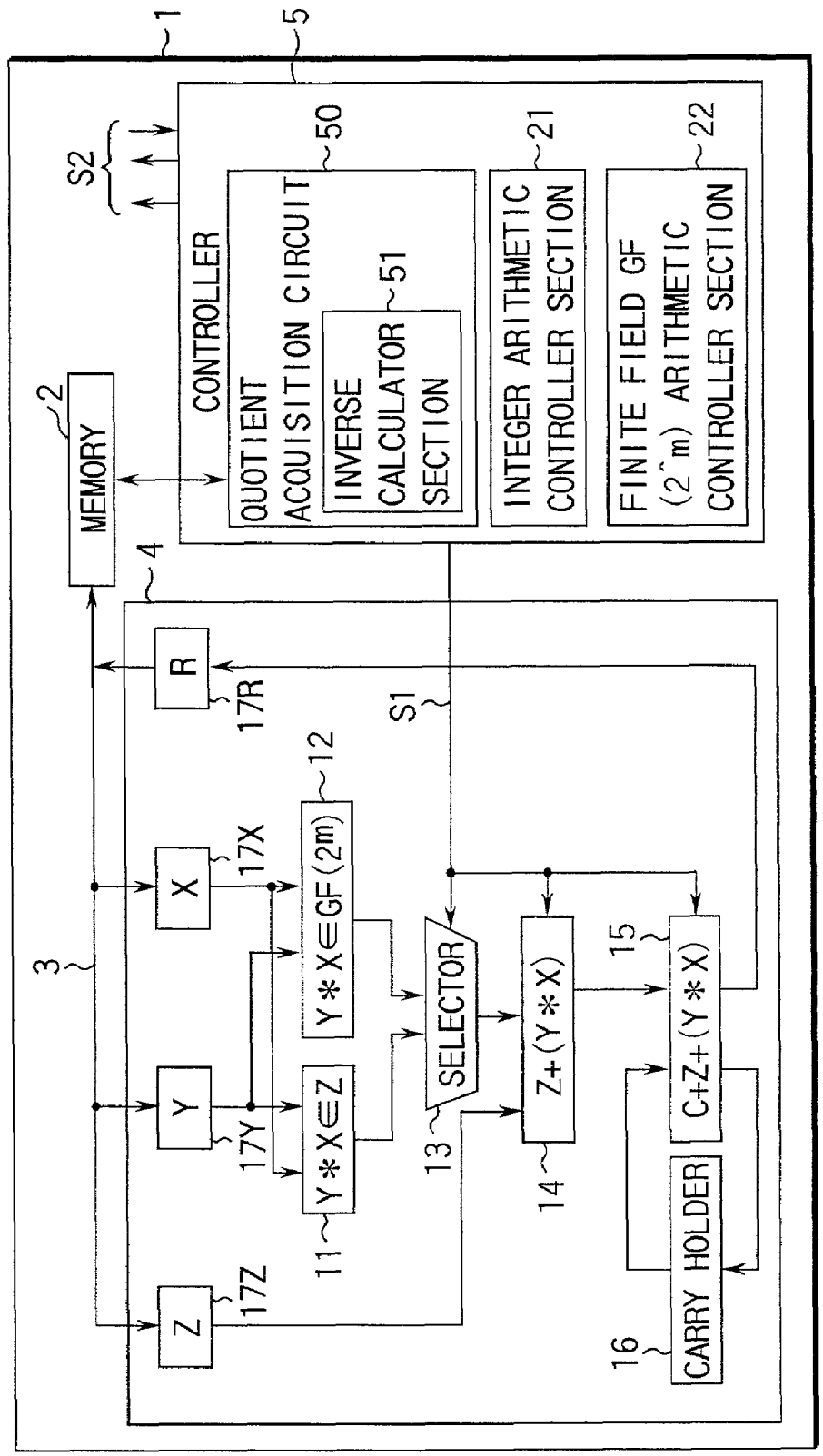
FIG. 10 is a block diagram showing an example of the arrangement of a coprocessor applied to an arithmetic apparatus and crypto processing apparatus according to the third embodiment of the present invention.

FIG. 10 is a block diagram showing an example of the arrangement of a coprocessor applied to an arithmetic apparatus and crypto processing apparatus according to the third embodiment of the present invention.

This embodiment is a concrete example of the modulo section of the first embodiment. As shown in FIG. 10, a controller unit 5 includes a finite field GF(2^m) arithmetic controller 22 having a modulo function added to the above function, and a quotient acquisition circuit 50 which is controlled by the modulo function and has an inverse calculator section 51.

In this case, in addition to the above function of controlling an arithmetic unit 4 to obtain a multiply result of c'(x) of equation (5), the finite field GF(2^m) arithmetic controller 22 has the function of controlling the arithmetic unit 4 and quotient acquisition circuit 50 to execute a modulo for this multiply result c'(x) using a modulo polynomial f(x). More specifically, the control function includes the function of inputting/outputting data to/from a memory 2 and buffers 17X, 17Y, 17Z, and 17R on the basis of the operation algorithm to be described later, and the function o generating various commands such as a multiply command, addition command, and inverse operation command and supplying them to corresponding arithmetic circuits in accordance with the input/output operation.

The quotient acquisition circuit 50 is used to calculate a quotient by dividing the dividend polynomial c'(x) by the modulo polynomial f(x) as part of a modulo. In this case, the quotient acquisition circuit 50 has the function of obtaining the above quotient by multiplying an inverse $\beta(x)$ of the modulo polynomial f(x) and the dividend polynomial c'(x).

Figure 11:
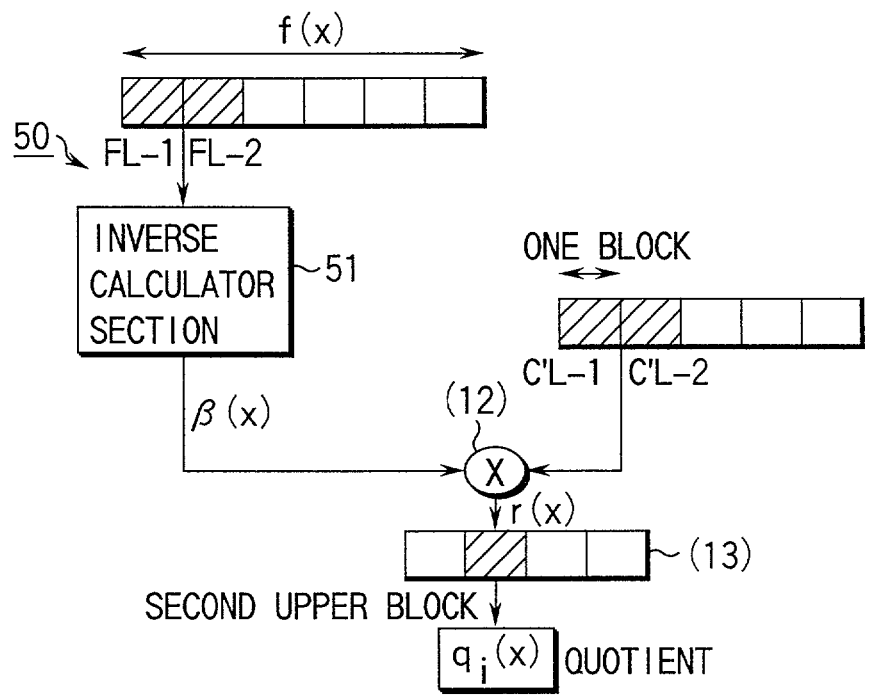
FIG. 11 is a schematic view showing the arrangement of a quotient acquisition circuit in the third embodiment.

More specifically, the quotient acquisition circuit 50 is controlled by the finite field GF(2^m) arithmetic controller 22, and has the function of supplying the upper two blocks $(F_{L-1(x)}, F_{L-2(x)})$ of the modulo polynomial f(x) in the memory 2 to the inverse calculator section 51 in only one time of the modulo and making the section 51 calculate the inverse $\beta(x)$ of the upper two blocks, the function of reading out the obtained inverse $\beta(x)$ from the memory 2 when the inverse is written in the memory 2, the function of obtaining a quotient $\gamma(x)$ by multiplying the readout inverse $\beta(x)$ and the upper two blocks $(C'_{L-1(x)}, C'_{L-2(x)})$ of the current dividend polynomial, the function of setting the obtained quotient $\gamma(x)$ as a quotient $qi(x)$ of the upper two blocks and writing the quotient $qi(x)$ in the memory 2, and the function of repeating the operation from reading out the inverse $\beta(x)$ to writing the quotient $qi(x)$ until a residue c(x) is obtained, as shown in FIG. 11.

Figure 12:
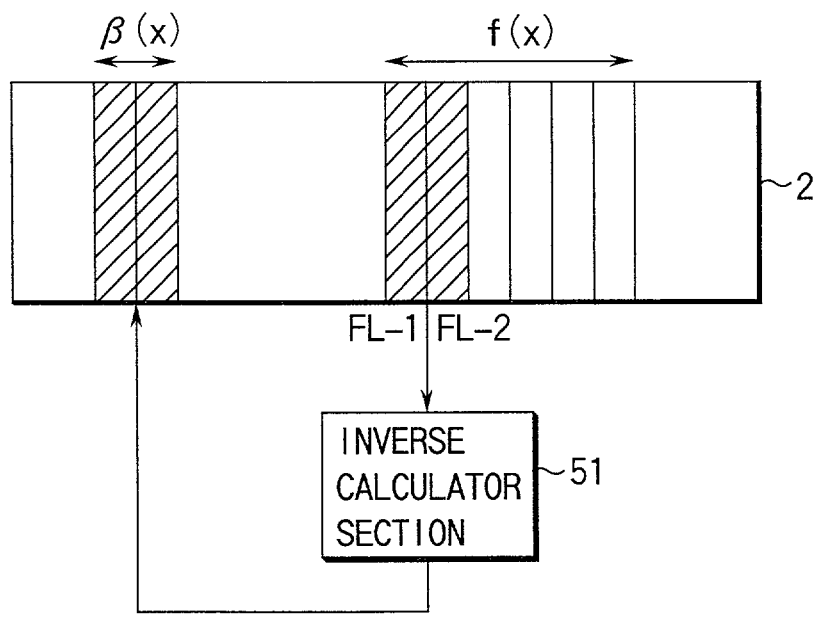
FIG. 12 is a schematic view for explaining the function of an inverse calculator section in the third embodiment.
Figure 13:
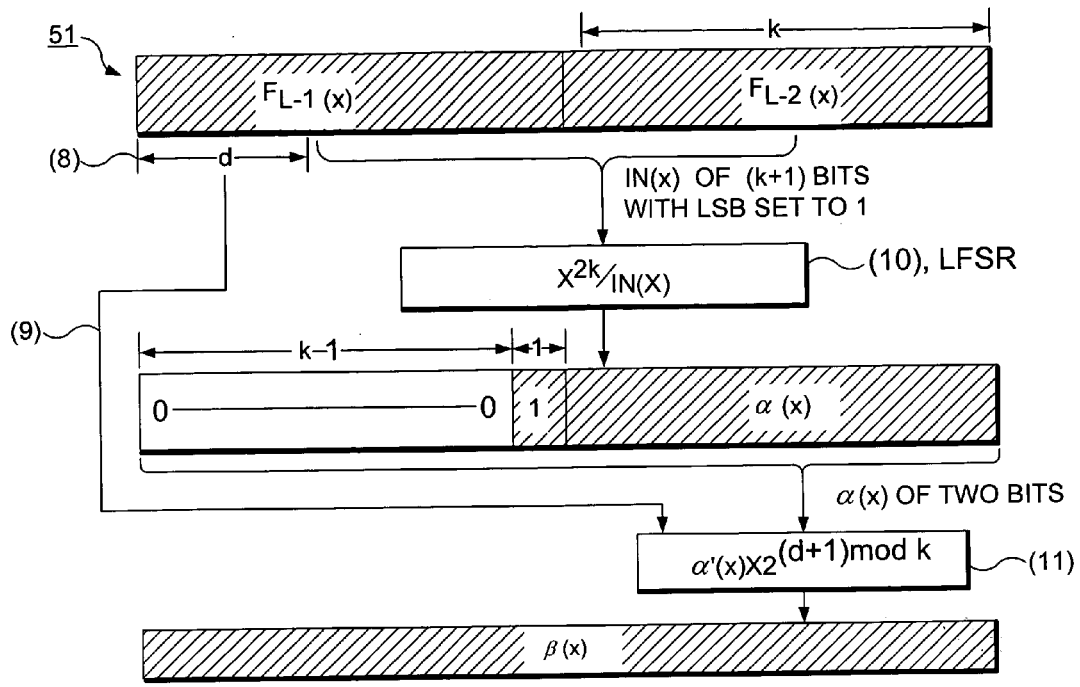
FIG. 13 is a schematic view showing the arrangement of the inverse calculator section in the third embodiment.
Figure 27:
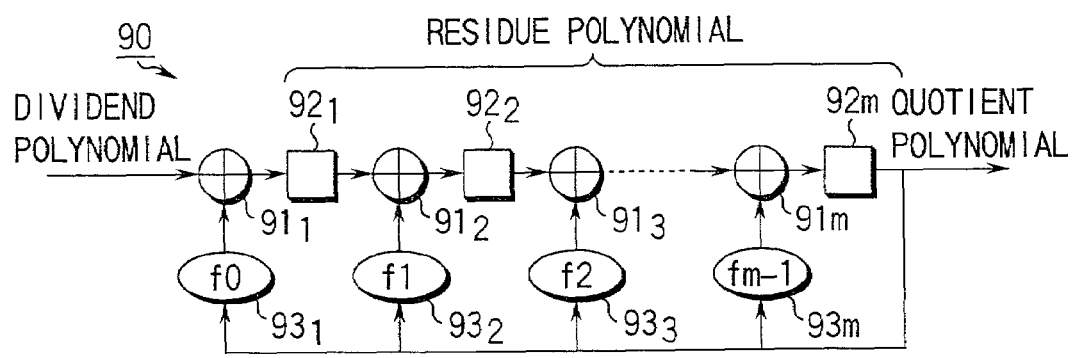
FIG. 27 is a block diagram showing the arrangement of a general linear feedback shift register LFSR.

As shown in FIG. 13, the inverse calculator section 51 has the function of calculating the inverse $\beta(x)$ of the upper two blocks $(F_{L-1(x)}, F_{L-2(x)})$ of the modulo polynomial f(x) in the memory 2 upon reception of the two blocks $(F_{L-1(x)}, F_{L-2(x)})$ from the quotient acquisition circuit 50 as shown in FIG. 12, and the function of writing the obtained inverse β(x) in the memory 2. The LFSR shown in FIG. 27 is used as a divide circuit in part of the inverse calculator section 51.

In this case, the inverse β(x) has a fixed number of bits, and is not a simple inverse but is corrected in advance as shown in FIG. 13 to eliminate the necessity to normalize a divisor and denormalize an operation result in the subsequent main modular multiplication. In addition, the inverse β(x) itself may be calculated by the arithmetic unit 4 instead of the quotient acquisition circuit 50 including the inverse calculator section 51.

If, for example, the bus width of an integer based product-sum operation circuit is as small as 8 bits, the inverse calculator section 51 may be replaced with a scheme of storing the inverses of all the 8 bit values as a table in a ROM or the like. If, however, the bus width is 16 bits or more, the inverse calculator section 51 is more preferable than the scheme of storing the inverses of all 16 bit values in a ROM in consideration of a reduction in cost.

The operation of the arithmetic apparatus (coprocessor) having the above arrangement will be described next.

Figure 14:
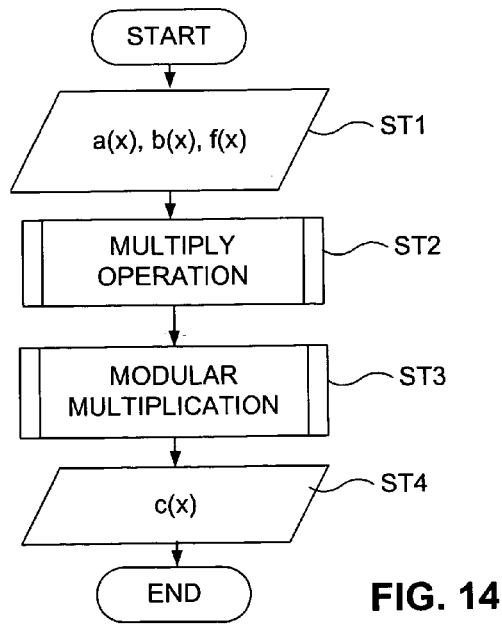
FIG. 14 is a flow chart for explaining a modular multiplication for a finite field $GF(2^m)$ based polynomial base in the third embodiment.

In a modular multiplication for a finite field GF(2^m) based polynomial base according to the present invention, a multiply operation and modulo are separately performed. More specifically, as shown in FIG. 14, polynomials a(x) and b(x) as multiplicand/multiplier and a modulo polynomial f(x) are input, as shown in FIG. 14 (step ST1), and a multiply operation of a(x)·b(x) is performed to obtain a multiply result $C'_{(x)}$ having a double bit length (step ST2). A modulo of $C'_{(x)mod}$ f(x) is then performed (step ST3) to obtain a residue c(x) (step ST4).

The multiply operation in step ST2 is performed in the same manner as in the first and second embodiments. The modulo in steps ST3 and ST4 will be described below. Calculation on paper will be described first, and an actual process corresponding to calculation on paper will then be described.

Figure 15:
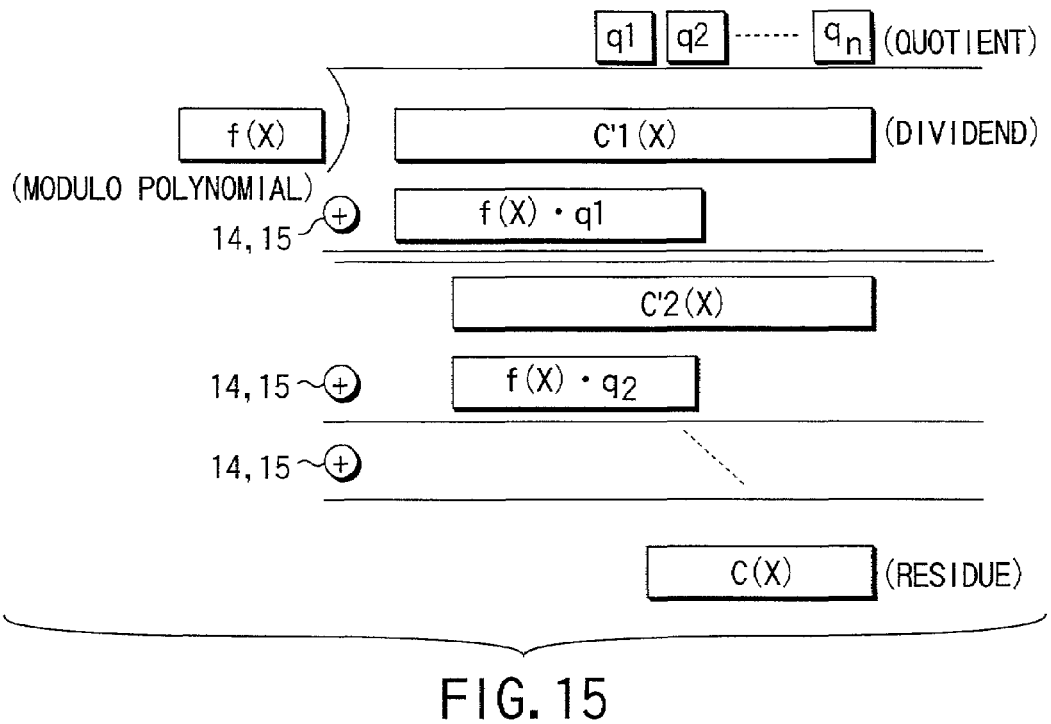
FIG. 15 is a schematic view showing calculation on paper to explain a modulo in the third embodiment.

As indicted by calculation on paper in FIG. 15, a modulo for equation (6) is performed after the divisor f(x) and dividend c'(x) are divided into unit blocks each consisting of a predetermined number $k$ of bits. Note that, for example, the number of bits of each unit block may be set in correspondence with the bus width of the coprocessor 1.

An upper block c'L–i(x) of the dividend c'(x) is divided by f(x), and a quotient qi(x) of one block is acquired from the upper digit. An operation of c'(x)–f(x)·qi(x) is then performed to subtract the dividend c'(x) of one block from the upper digit.

More specifically, every time the quotient qi(x) of one block is multiplied by the divisor polynomial f(x), (m+1) blocks are obtained as a multiply result. This multiply result is subtracted (=added) from the current dividend polynomial c'(x) to calculate the next dividend polynomial of (2m–1*n) blocks (n is the number of times of multiply operations). That is, the previous dividend c'(x) is decreased in units of blocks.

A modulo is completed by repeating this processing, from acquiring a quotient to subtracting the quotient, $n$ times (=the number of bits of a dividend/the number of bits of each unit block) and obtaining the residue c(x).

Actual processing for a modulo will be described next.

Figure 16:
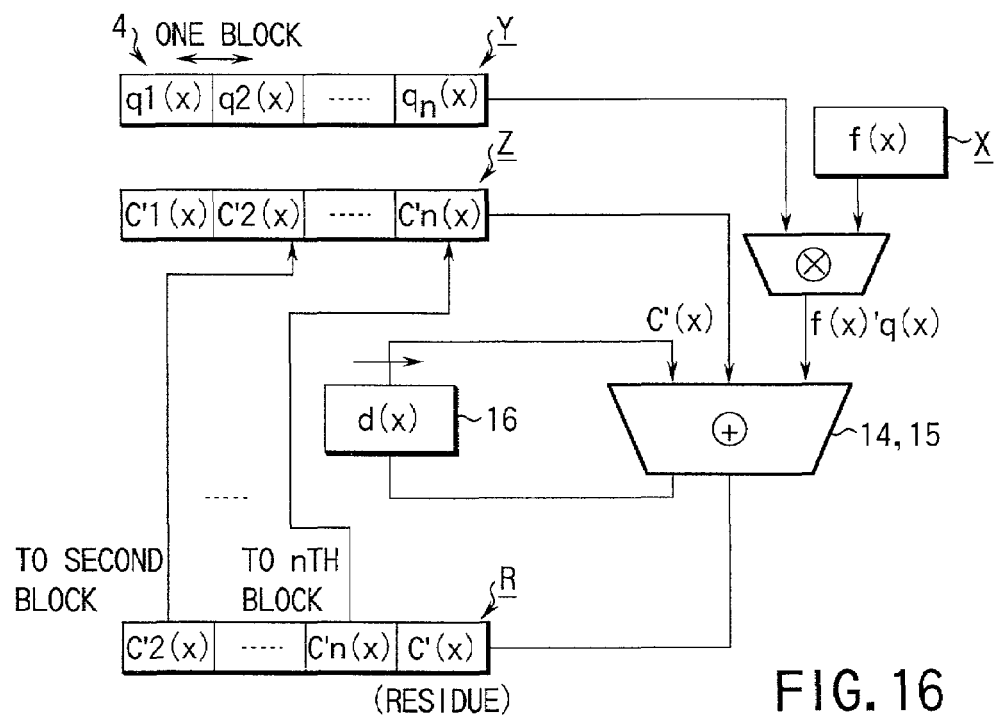
FIG. 16 is a schematic view showing the processing performed by an arithmetic unit in the third embodiment.

In the above modulo, the quotient acquisition circuit 50 acquires the quotient qi(x) as shown in FIG. 11, and the arithmetic unit 4 decreases the dividend c'(x) by calculating c'(x)–f(x)·qi(x) as shown in FIG. 16. The operations of the quotient acquisition circuit 50 and arithmetic unit 4 will be sequentially described below.

In calculating the first quotient, the quotient acquisition circuit 50 reads out the upper two blocks ($F_{L-1}(x)$, $F_{L-2}(x)$) of the divisor f(x) from the memory 2 and inputs them to the inverse calculator section 51 to calculate the inverse β(x) of the divisor f(x), as shown in FIGS. 11 and 12.

As shown in FIG. 13 and equation (8), the inverse calculator section 51 stores a number $d$ of consecutive 0s from the most significant bit MSB of the upper one block $F_{L-1}(x)$ of the two blocks ($F_{L-1}(x)$, $F_{L-2}(x)$) given by $$d = \text{count\_zero}(F_{L-1}(x)) \quad (8)$$

where count_zero( ) is a function of counting the number of consecutive 0s from the MSB of the value of ( ).

The inverse calculator section 51 also calculates a number $h$ of digits of a left shift (to be described later) on the basis of this number $d$ of invalid digits by $$h = (d+1) \bmod k \quad (9)$$

and stores it.

As shown in FIG. 13 and equation (10), the inverse calculator section 51 calculates an inverse α(x) of the upper two blocks ($F_{L-1}(x)$, $F_{L-2}(x)$) of the divisor f(x) using an LFSR 90 by $$\alpha(x) = x^{2k}/(F_{L-1}(x) \cdot x^k + F_{L-2}(x)) \quad (10)$$

A case in which one block consists of 16 bits (k=16) will be described. Assume also that a dividend is $x^{2*16}$ ($=x^{2k}$) whose most significant bit MSB is "1" and other bits are "0".

After setting the upper two blocks ($F_{L-1(x)}$, $F_{L-2(x)}$) as a divisor in a coefficient unit 93 in FIG. 27, the inverse calculator section 51 inputs the dividend $x^{2k}$ to the shift register from higher orders and repeats a shift in units of clocks 2*16 times, thereby obtaining a 32-bit inverse α(x). Note that one block may consist of 8 or 32 bits or another arbitrary number of bits. In such a case as well, the inverse α(x) can be calculated by the same scheme.

Subsequently, the inverse calculator section 51 concatenates "0s" of (k–1) bits and "1" of one bit to the MSB of this inverse α(x) to obtain a 2k-bit value α'(x). The inverse calculator section 51 then shifts this 2k-bit value α'(x) to the left by the number $h$ of digits of the left shift, obtained by equation (9), to calculate the corrected inverse β(x):

$$\beta(x) = \alpha'(x) \cdot x^h \quad (11)$$

In this case, the corrected inverse β(x) is a value that satisfies equations (8) to (11) above. The inverse β(x) is calculated only once with respect to the supplied modulo polynomial f(x) and stored in the memory 2, and is read out from the memory 2 afterward. Even if the dividend changes, the inverse β(x) remains the same as long as the modulo polynomial f(x) remains the same. For this reason, the inverse β(x) may be read out from the memory 2 without calculating any new inverse.

In a quotient calculation, if the inverse β(x) is set in advance, a modulo can be executed by equations (12) to (15) given below.

As indicated by equation (12) and FIG. 11, the quotient acquisition circuit 50 multiplies the upper two blocks ($C'_{L-1}(x)$, $C'_{L-2}(x)$) of a current dividend C'i (0≦i≦n) and the inverse β(x)

$$\gamma(x) = \beta(x) \cdot (C'L-1(x) \cdot x^k + C'L-2(x)) \quad (12)$$

In addition, as indicated by equation (13), the quotient acquisition circuit 50 extracts a digit corresponding to a quotient qi(x) of one block, as the second upper block, from a result γ(x), as per $$qi(x)=\gamma(x)/x^{2k} \qquad (13)$$

and writes it in the memory 2. Thus, the quotient qi(x) of one block is obtained.

As shown in FIG. 16, the arithmetic unit 4 subtracts a product f(x)·qi(x) of the divisor and the quotient from the current dividend c'i(x).

More specifically, in the arithmetic unit 4, a finite field GF(2^m) based multiplier circuit 12 multiples the modulo polynomial f(x) and the quotient qi(x) of the current one block to obtain a multiply result P(x):

$$P(x)=f(x)\cdot qi(x) \qquad (14)$$

Adder circuits 14 and 15 subtract (=add) this multiply result P(x) from the current dividend C'i to obtain a next dividend C'i+1

$$C'i+1=C'i+P(x) \qquad (15)$$

Equations (12) to (15) are repeatedly calculated n times to finally obtain a modulo result c(x), as shown in FIGS. 14 to 16. This residue c(x) (=[$c_{m-1}$, ..., $c_1$, $c_0$]) corresponds to the final modular multiplication result c(x) indicated by equation (3).

With the above processing, the modular multiplication result c(x) represented by equation (6) can be calculated from the multiply result c'(x) represented by equation (5) described in the first or second embodiment, thus completing a modular multiplication defined by multiply and modulo.

(Evaluation)

The processing speeds and circuit sizes of the coprocessors 1 of the first to third embodiments, which perform modular multiplications in the above manner, were evaluated. The evaluation results will be sequentially described below.

(Evaluation of Processing Speed)

FIG. 17 shows the required numbers of clocks of commands in the coprocessor 1 when m (number of bits)=160 and m=1024. When this coprocessor is applied to the elliptic curve crypto system, m (number of bits)=160 is a typical size. In the case of m=1024 in FIG. 17, since the maximum key length currently regarded as a save value in the integer based RSA cryptosystem is 1,024 bits, the values in FIG. 17 are presented as speed estimates in consideration of an expected increase in the key length of an elliptic curve crypto.

For a comparison between processing speeds, the numbers of processing clocks in addition, multiply, and square operations of an extension of field GF of 2 ($2^{160}$) of 160 bits were evaluated. FIG. 18 shows the results. Note that the numbers of clocks in addition, square, and multiply operations include the numbers of clocks based on a modulo using a modulo polynomial unlike the case shown in FIG. 17 for the sake of a comparison with the speed of a GF ($2^{160}$) operation.

Each SR ratio as a comparative value is obtained by dividing the number of blocks in the coprocessor 1 by the number of clocks in a general shift register circuit. The smaller this value the higher the processing speed. According to these SR ratios, the coprocessor 1 of the present invention can execute finite field GF(2^m) arithmetic operations, excluding an addition operation, at a processing speed equal to or higher than that of the general shift register circuit.

(Evaluation of Circuit Size)

As shown in FIG. 19, the total circuit size of the coprocessor 1 corresponds to about 30k gates. The circuit of the coprocessor 1 is formed by adding the circuit for processing a finite field GF(2^m) arithmetic operation to an integer based coprocessor.

More specifically, as shown in FIG. 20, in the arithmetic unit 4, the carry switching circuit is added to the product-sum operation circuit. In the controller unit 5, the quotient acquisition circuit 50 is added for a divide operation, although it is scarcely required to add any circuits for addition, multiply, and square operations. No RAM (memory 2) and I/F need be added because they are shared with the integer based coprocessor.

The total circuit size of additional circuits is about 5k gates. The additional circuit size of 5k gates is not very large in the recent LSI technology. That is, this size falls within the range in which the coprocessor 1 of the present invention can be satisfactorily used in place of the existing coprocessor.

Figures 21, 23:
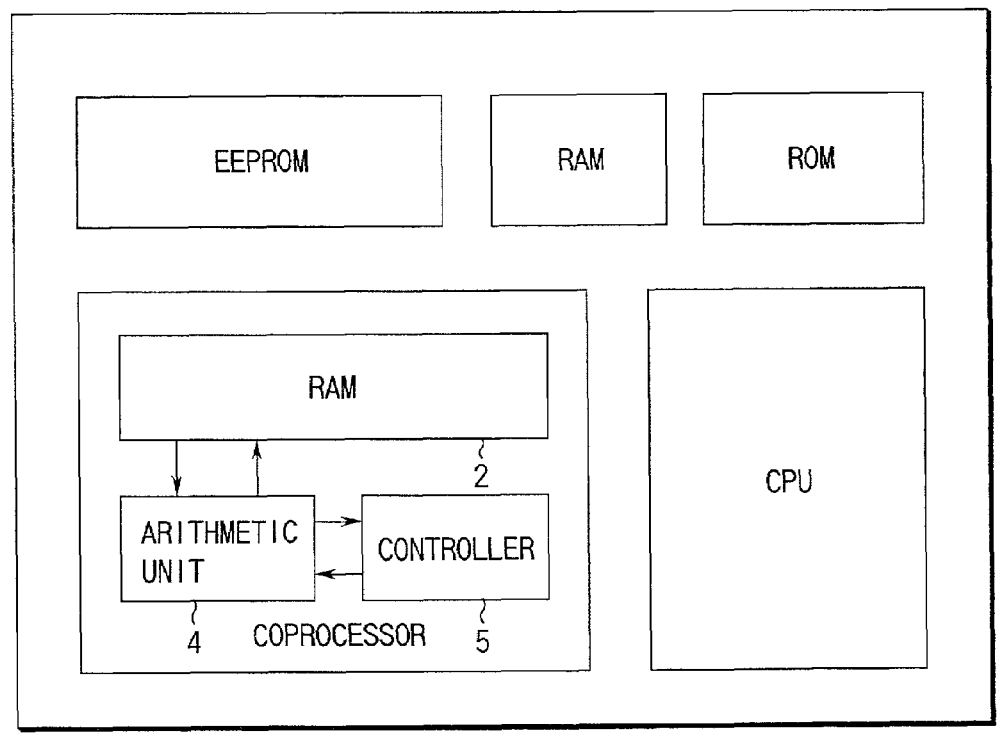
FIG. 21 is a view showing the circuit sizes of coprocessors designed specifically for $GF(2^m)$ operations for the sake of comparison in the third embodiment.
FIG. 23 is a block diagram showing an IC card LSI including a crypto processing coprocessor.

For the sake of comparison, the circuit sizes of coprocessors designed specifically for finite field GF(2^m) arithmetic operations were estimated when finite field GF(2^m) arithmetic operation functions (addition, multiply, and square operations) were realized without using the coprocessor 1 of the present invention. FIG. 21 shows the results.

As shown in FIG. 21, when m=160, the circuit size of the coprocessor designed specifically for finite field GF(2^m) arithmetic operations is 10k gates. When m=1024, this size becomes 16k gates. Obviously, therefore, finite field GF(2^m) arithmetic operation functions can be realized by the coprocessor 1 of the present invention with an additional circuit size about ½ to ⅓ that required when the coprocessor designed specifically for finite field GF(2^m) arithmetic operations is used.

As described above, according to this embodiment, in addition to the effects of the first embodiment, the following effects can be obtained. Since the long product-sum operation circuit performs an arithmetic operation in a modulo instead of the linear feedback shift register LFSR 90, an arbitrary degree m equal to or larger than 1 can be used. Even if the degree m of a finite field GF(2^m) increases, an arithmetic operation can be executed without modifying the apparatus. In addition, the elimination of hardware restrictions due to limitations on the degree m allows the apparatus to properly cope with an increase in the number of bits of a crypto key.

In addition, since a finite field GF(2^m) based modular multiplication is divided into multiply processing and modulo (divide) to allow the use of an arbitrary modulo polynomial f(x), general versatility can be improved.

In a modulo, when the quotient acquisition circuit 50 calculates a quotient on the basis of the dividend polynomial c'(x) and divisor polynomial f(x) to acquire a quotient polynomial qi(x) of one block with the number of bits corresponding to the bus width from higher orders, the arithmetic unit 4 calculates the next dividend polynomial c'i−1(x) from the current dividend result qi(x)·f(x) of the quotient polynomial qi(x) and divisor polynomial f(x) from the current dividend polynomial c'i(x).

The coprocessor 1 obtains the residue c(x) by repeating this processing, from calculating the quotient using the quotient acquisition circuit 50 to calculating the dividend polynomial data by the product-sum operation using the arithmetic unit 4. This makes it possible to realize an efficient modulo and quotient calculation by utilizing the characteristics of hardware.

In a quotient calculation, the quotient acquisition circuit 50 multiplies the inverse data of the upper two blocks of divisor polynomial data and the upper two blocks of the current dividend polynomial data, and sets the second upper block of the multiply result as the quotient polynomial data of one block. The quotient acquisition circuit 50 can extract an effective number portion from the obtained quotient polynomial. Therefore, the operation precision can be optimized.

In a quotient calculation, an independent command is set to calculate the inverse $\beta(x)$ from the upper two blocks of the divisor polynomial f(x), and the inverse $\beta(x)$ is calculated before a finite field-GF($2^m$) arithmetic operation. The obtained inverse $\beta(x)$ is stored in the memory 2. In executing a modulo, the inverse $\beta(x)$ is read out from the memory 2.

In executing redundant modulo under the same modulo polynomial, a quotient is acquired by reading out inverse data from the memory, and hence the time required to calculate inverse data can be saved in the second and subsequent quotient calculations. This can shorten the processing time for a finite field GF($2^m$) based multiply (modular multiplication) and square operation. In addition, since the inverse $\beta(x)$ can be calculated in advance, a finite field GF($2^m$) based modular multiplication can be realized by using only the product-sum operation circuit for performing multiply and addition operations.

In calculating inverse data, the quotient acquisition circuit 50 counts the number of consecutive 0s from the high-order bits of the upper two blocks of divisor polynomial data, and extracts polynomial data of 1 block+1 bit from the high-order bits such that the most significant bit is set to 1. The quotient acquisition circuit 50 obtains the inverse of the extracted polynomial data, and concatenates 1-block corrected data whose least significant bit is 1 and other bits are 0 to the most significant bit of the obtained inverse so as to obtain 2-block data as a whole. The quotient acquisition circuit 50 then bit-shifts this data to the high-order side by an amount corresponding to the count of 0s, and sets the resultant data as inverse data.

A corrected value is set as inverse data to avoid normalization of a divisor, correction of an approximate quotient, and denormalization of operation results such as a quotient and residue, which are performed on the basis of the Knuth algorithm with a single precision divide operation which is used in a general long integer based divide operation. This makes it possible to decrease the number of times of bit shifts and optimize the arithmetic apparatus.

In an integer based multiply operation, for example, $m$ bits*$m$ bits=2m bits, so that even if consecutive 0s are arranged as several upper bits of the 2m bits, the number of effective bits is 2m. If a divide operation (modulo) is to be performed by using this multiply result, since a divide operation cannot be performed by using 0, a divisor and dividend must be shifted to the left to be normalized in advance such that 1 is set at the MSB. When the operation is complete after a a predetermined loop, the operation result (quotient an residue) must also be denormalized by being shifted to the right by the number of bits by which the divisor and dividend were shifted to the left.

In this embodiment, since a divisor (inverse data $\beta(x)$) in a quotient operation is corrected to eliminate the need of processing before and after such a divide loop, the arithmetic apparatus can be optimized.

In this embodiment, since an arithmetic operation is executed in units of blocks instead of bits by using the corrected inverse $\beta(x)$, the number of times of bit shifts can be decreased, and the processing speed can be increased.

Furthermore, an arithmetic apparatus and encryption/decryption apparatus can be realized with a small additional circuit amount, each of which incorporates an LSI that operates at a processing speed equal to or higher than that of a general shifter register type finite field GF($2^m$) based multiplier circuit with a small number of commands and an arithmetic system using a long product-sum operation circuit, and can execute various cryptosystems based on an integer based operation and finite field GF($2^m$) arithmetic operation. As the cryptosystem using a finite field GF($2^m$) arithmetic operation, an elliptic curve cryptosystem such as a prime field based elliptic curve cryptosystem or polynomial base elliptic curve cryptosystem can be used.

This embodiment has been described as a concrete example of the divide process in the first embodiment. Even if, this embodiment is practiced as a concrete example of the divide process in the second embodiment, similar functions and effects can be obtained.

Fourth Embodiment

Figure 22:
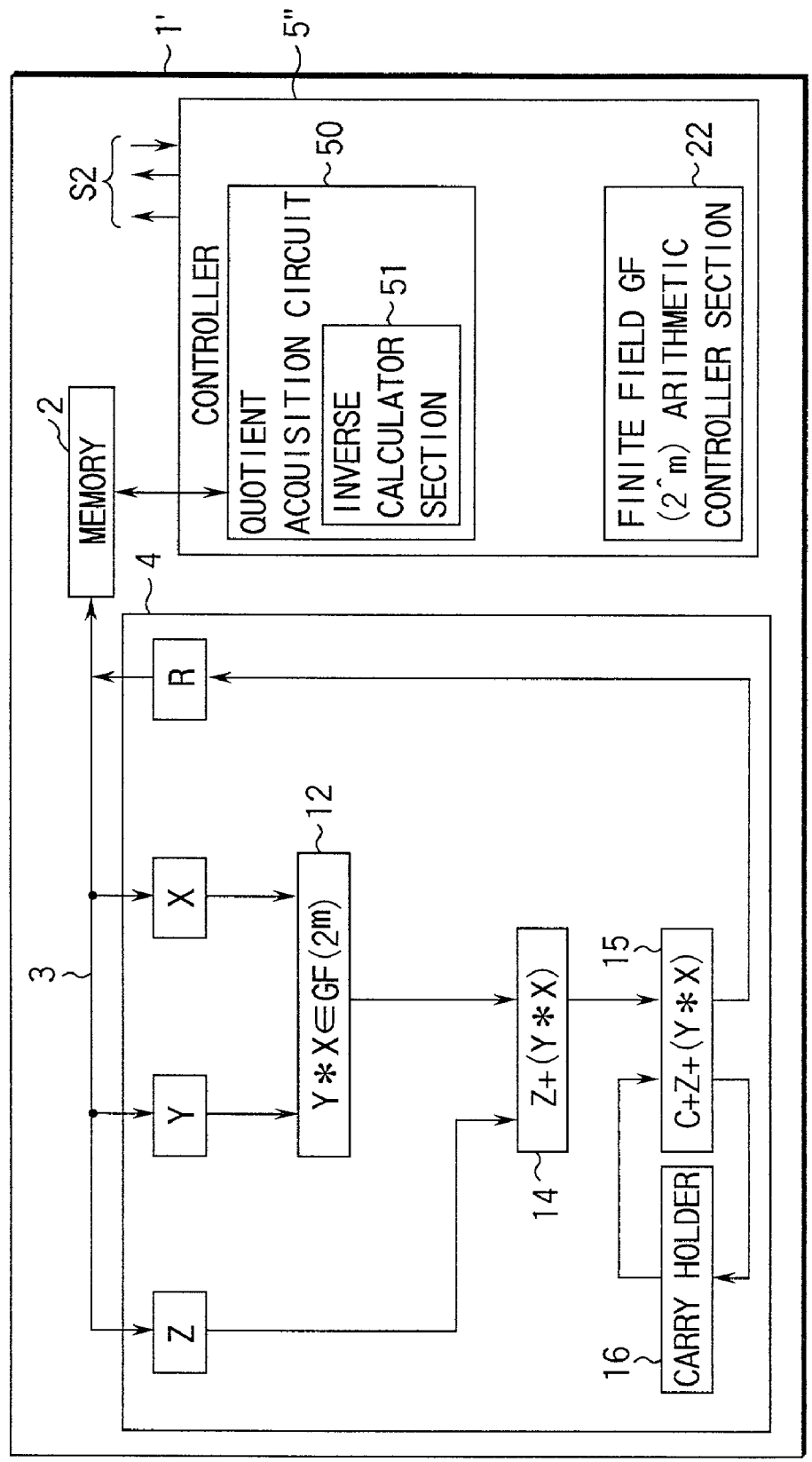
FIG. 22 is a block diagram showing an example of the arrangement of a coprocessor applied to an arithmetic apparatus and crypto processing apparatus according to the fourth embodiment of the present invention.

FIG. 22 is a schematic view showing an example of the arrangement of a coprocessor applied to an arithmetic apparatus and crypto processing apparatus according to the fourth embodiment of the present invention.

This embodiment is a modification of each of the first to third embodiments and an arithmetic apparatus designed specifically for finite field GF($2^m$) arithmetic operations. More specifically, the integer based multiplier circuit 11, selector 13, and integer arithmetic controller 21 are omitted from the arrangement of this apparatus. Since the same arithmetic algorithm as that described above is used, finite field GF($2^m$) based multiply processing is divided into a multiply operation and modulo, and the modulo is executed after the multiply operation.

With the above arrangement, the same effects as those of the first to third embodiments can be obtained except for the function/effect of an integer based operation itself and the function/effect of switching of the integer based operation mode and finite field GF($2^m$) arithmetic operation. In other words, the same effects as those associated with finite field GF($2^m$) arithmetic operations in the first to third embodiments can be obtained.

As has been described in detail above, according to the present invention, an arithmetic apparatus and crypto processing apparatus which can execute a finite field GF($2^m$) arithmetic operation as well as an integer based operation can be provided by only adding a minimum architecture.

In addition, there are provided an arithmetic apparatus and crypto processing apparatus which can execute arithmetic operations without modifying the apparatus configurations even if the degree $m$ of a finite field GF($2^m$) increases.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An arithmetic apparatus incorporated in a LSI for performing a long integer product-sum arithmetic operation, the arithmetic apparatus comprising:
   an arithmetic unit comprising:
   an integer based multiplier circuit;
   a finite field $GF(2^m)$-based multiplier circuit logically adjacent to but separated from said integer based multiplier circuit;
   an adder circuit shared by the separated integer based multiplier circuit and the finite field $GF(2^m)$-based circuit and configured to operate on data from either the integer based multiplier circuit or the finite field $GF(2^m)$-based circuit; and
   a selector configured to select one of said integer multiplier circuit and said finite field $GF(2^m)$-based multiplier circuit, and
   a controller controlling said selector to make said selection.

2. An apparatus according to claim 1, wherein:
   the adder circuit has a buffer for storing interim result data, adds the interim result data to result data from one of said integer based multiplier circuit and said finite field $GF(2^m)$-based multiplier circuit which is selected by said selector, propagates a carry in an integer based unit arithmetic operation, and propagates no carry in a finite field $GF(2^m)$ based unit arithmetic operation.

3. An apparatus according to claim 2, wherein the arithmetic unit further comprises:
   a carry holder for storing a carry obtained in a previous operation cycle, and an output-stage adder circuit configured to add the carry in said carry holder to an output from said adder circuit, output an upper bit of an addition result as an updated carry to said carry holder, and output a lower bit of the addition result as operation result data.

4. A crypto processing apparatus for selectively encrypting or decrypting based on an integer based operation by said arithmetic apparatus defined in claim 1, and encrypting or decrypting based on a finite field $GF(2^m)$ based unit arithmetic operation by said arithmetic apparatus.

* * * * *